US012108324B2

(12) United States Patent
Won et al.

(10) Patent No.: US 12,108,324 B2
(45) Date of Patent: Oct. 1, 2024

(54) NETWORK SLICE-SPECIFIC ACCESS BARRING FOR WIRELESS NETWORKS

(71) Applicant: NOKIA TECHNOLOGIES OY, Espoo (FI)

(72) Inventors: Sung Hwan Won, Seoul (KR); Malgorzata Tomala, Wroclaw (PL); Betsy Covell, Naperville, IL (US)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 16/638,267

(22) PCT Filed: Aug. 2, 2018

(86) PCT No.: PCT/FI2018/050570
§ 371 (c)(1),
(2) Date: Feb. 11, 2020

(87) PCT Pub. No.: WO2019/030429
PCT Pub. Date: Feb. 14, 2019

(65) Prior Publication Data
US 2020/0178158 A1    Jun. 4, 2020

Related U.S. Application Data

(60) Provisional application No. 62/544,519, filed on Aug. 11, 2017.

(51) Int. Cl.
*H04W 48/06* (2009.01)
*H04W 48/04* (2009.01)
(Continued)

(52) U.S. Cl.
CPC ........... *H04W 48/06* (2013.01); *H04W 48/04* (2013.01); *H04W 48/18* (2013.01); *H04W 76/27* (2018.02)

(58) Field of Classification Search
CPC ..... H04W 48/06; H04W 48/04; H04W 48/18; H04W 76/27
(Continued)

(56) References Cited

U.S. PATENT DOCUMENTS

2009/0279545 A1    11/2009 Moonen
2012/0244853 A1     9/2012 Iwamura et al.
(Continued)

FOREIGN PATENT DOCUMENTS

CN    106 572 516 A    4/2017
EP    3 096 560 A1    11/2016
(Continued)

OTHER PUBLICATIONS

U.S. Appl. No. 62/523,799, filed Jun. 23, 2017.*
(Continued)

*Primary Examiner* — Faisal Choudhury
(74) *Attorney, Agent, or Firm* — ALSTON & BIRD LLP

(57) ABSTRACT

A technique includes detecting, by a user device, a network slice associated with an access attempt by the user device to access a wireless network, and making, by the user device, a barring decision for the access attempt based on the network slice associated with the access attempt. Another example technique may include receiving, by a base station from one or more core network entities within a wireless network, network slice-specific load information that indicates a load for each of one or more network slices, determining, by the base station based on the received network slice-specific load information, a barring configuration that indicates a set of barring parameters for one or more access categories, and sending, by the base station to a user device, the barring configuration to reduce a load on the wireless network.

59 Claims, 11 Drawing Sheets

(51) Int. Cl.
    *H04W 48/18* (2009.01)
    *H04W 76/27* (2018.01)
(58) Field of Classification Search
    USPC .......................................................... 370/330
    See application file for complete search history.

(56) References Cited

U.S. PATENT DOCUMENTS

| | | | |
|---|---|---|---|
| 2013/0035064 | A1 | 2/2013 | Balachandran et al. |
| 2014/0248874 | A1 | 9/2014 | Zhang et al. |
| 2015/0215225 | A1* | 7/2015 | Mildh .................... H04L 47/263 |
| | | | 370/236 |
| 2015/0223146 | A1 | 8/2015 | Pinheiro et al. |
| 2016/0219493 | A1 | 7/2016 | Kim et al. |
| 2017/0013501 | A1 | 1/2017 | Kim et al. |
| 2017/0041854 | A1* | 2/2017 | Kim .................... H04W 28/0289 |
| 2017/0048748 | A1 | 2/2017 | Susitaival et al. |
| 2017/0141973 | A1 | 5/2017 | Vrzic |
| 2018/0109992 | A1* | 4/2018 | Lee .................... H04W 28/0268 |
| 2018/0295539 | A1 | 10/2018 | Feng |
| 2019/0159108 | A1* | 5/2019 | Lee ........................ H04W 76/27 |
| 2019/0174392 | A1* | 6/2019 | Chun ..................... H04W 16/02 |
| 2019/0174536 | A1* | 6/2019 | Han ..................... H04W 74/002 |
| 2019/0230584 | A1 | 7/2019 | Lou et al. |
| 2019/0357119 | A1* | 11/2019 | Hong ..................... H04L 1/1614 |
| 2020/0120580 | A1* | 4/2020 | Jin ........................ H04W 48/02 |

FOREIGN PATENT DOCUMENTS

| | | |
|---|---|---|
| EP | 3 167 659 A1 | 5/2017 |
| EP | 3163947 A1 | 5/2017 |
| EP | 3481109 A1 | 5/2019 |
| EP | 3490299 A1 | 5/2019 |
| EP | 3 509 355 A1 | 7/2019 |
| EP | 3562213 A1 | 10/2019 |
| EP | 3576466 B1 | 12/2019 |
| EP | 3908045 A1 | 11/2021 |
| JP | 2011/101335 A | 5/2011 |
| JP | 2014/525217 A | 9/2014 |
| JP | 2017/509283 A | 3/2017 |
| RU | 2605437 C2 | 12/2016 |
| WO | WO 2013/021318 | 2/2013 |
| WO | WO 2013/112410 A1 | 8/2013 |
| WO | WO 2013/141600 A1 | 9/2013 |
| WO | WO 2016/006948 A1 | 1/2016 |
| WO | WO 2016/118104 A1 | 7/2016 |
| WO | WO 2017/029597 A1 | 2/2017 |
| WO | WO 2017/054183 A1 | 4/2017 |
| WO | WO 2017/074486 A1 | 5/2017 |
| WO | WO 2017/119844 A1 | 7/2017 |
| WO | WO 2018/229602 A1 | 12/2018 |
| WO | WO 2019/032798 A1 | 2/2019 |

OTHER PUBLICATIONS

Office Action for Australian Application No. 2018314932 dated Aug. 22, 2020, 7 pages.
Notice of Acceptance for Australian Patent Application No. 2018314932 dated Jul. 13, 2021, 3 pages.
International Search Report and Written Opinion for Application No. PCT/FI2018/050570 dated Oct. 17, 2018, 32 pages.
3$^{rd}$ Generation Partnership Project; Technical Specification Group Services and Systems Aspects; Service Accessibility (Release 15) 3GPP TS 22.011 V15.1.0 (Jun. 2017) 32 pages.
Pseudo-CR on Unified Access Control, 3GPP TSG-CT WG1 Meeting #104, C1-172280 (May 2017).
5G Access Control, 3GPP TSG CT WGI Meeting #104, C1-172291 (May 2017).
LS on Access Control for Nr, 3GPP TSG CT WGI Meeting #103, C1-171293 (Apr. 2017).
Update of Solution #1 for Key Issue #1, 3GPP SA WG2 Meeting #114, S2-161503, Huawei, HISILICON (Apr. 2016) 4 pages.
Office Action for Korean Application No. 2020-7007136 dated Apr. 15, 2021, 13 pages.
Search Report and Written Opinion for Singapore Application No. 11202001072W dated Apr. 13, 2021, 11 pages.
Ericsson, "Access Control for NR", 3GPP Draft, 3GPP TSG-RAN WG2 NR#2, R2-1706505 (Jun. 27-29, 2017), 5 pages.
Ericsson, "Is UE AS Slice Agnostic or Not?", 3GPP Draft, 3GPP TSG-RAN WG2 #97bis, R2-1702554 (Apr. 3-7, 2017), 5 pages.
Samsung, "NR Access Control", 3GPP Draft, 3GPP TSG-RAN WG2 Meeting NR#2, R2-1706818 (Jun. 27-29, 2017), 3 pages.
Samsung, "NR Access Control", 3GPP Draft, 3GPP TSG-RAN WG2 Meeting #98, R2-1704455 (May 15-19, 2017), 3 pages.
Catt, "Slice Visibility to UE AS", 3GPP Draft, 3GPP TSG-RAN WG2 Meeting #97bis, R2-1703101 (Apr. 3-7, 2017), 3 pages.
Office Action for Russian Application No. 2020105917 dated Oct. 27, 2020, with English translation, 14 pages.
Office Action for Russian Application No. 2020105917 dated Jul. 15, 2020.
Search Report for Russian Application No. 2020105917 dated Jul. 14, 2020.
Office Action for Canadian Application No. 3,072,743 dated Apr. 23, 2021, 3 pages.
Office Action for Japanese Application No. 2020-507627 dated Mar. 11, 2021, 7 pages.
LG Electronics, "Discussion on the Access Control per Network Slice", 3GPP TSG SA WG2 Meeting #121, S2-173246 (May 15-19, 2017), 3 pages.
Examination Report for Australian Application No. 2018314932 dated Mar. 30, 2021, 10 pages.
Huawei, "Key Principles for Support of Network Slicing in RAN", 3GPP RAN WG2 Meeting #95, R2-165019, (Aug. 22-26, 2016), 3 pages.
Partial Supplementary European Search Report for European Application No. 18844187.7 dated Apr. 12, 2021, 20 pages.
ZTE, "Consideration on the Access Control in NR", 3GPP TSG-RAN WG2 Meeting 98, R2-1704680, (May 15-19, 2017), 3 pages.
Extended European Search Report for European Application No. 18844187.7 dated Aug. 16, 2021, 23 pages.
Office Action for Chinese Application No. 201880063423.4 dated Jul. 26, 2021, 18 pages.
Ericsson, "Establishment Causes for NR", 3GPP TSG-RAN WG2 NR#2, R2-1706511, (Jun. 27-29, 2017), 5 pages.
Huawei et al., "UE Slice Association/Overload Control Procedure", 3GPP TSG SA WG2 Meeting #115, S2-162981, (May 23-27, 2016), 9 pages.
Intel Corporation, "5G Access Control Mechanism", 3GPP TSG RAN WG2 AdHoc Meeting, R2-1707046, (Jun. 27-29, 2017), 8 pages.
Intel Corporation, "Consideration on Slicing Visibility to UE AS Layer", 3GPP TSG RAN WG2 Meeting #97bis, R2-1703442, (Apr. 3-7, 2017), 3 pages.
LG Electronics, "5G Network Selection and Network Slicing", 3GPP TSG-SA WG1 Meeting #77, S1-172022, (May 8-12, 2017), 6 pages.
Nokia et al., "RACH Isolation for Slices", 3GPP TSG-RAN WG2 Meeting #96, R2-168258, (Nov. 14-18, 2016), 3 pages.
Notice of Allowance for Korean Application No. 10-2020-7007136 dated Oct. 22, 2021, 3 pages.
Office Action for Chilean Application No. 202000314 dated Nov. 26, 2021, 26 pages.
Office Action for Japanese Application No. 2020-507627 dated Jan. 13, 2022, 7 pages.
First Examination Report for Indian Application No. 202047010154 dated Feb. 1, 2022, 8 pages.
Office Action for Canadian Application No. 3,072,743 dated Jan. 26, 2022, 5 pages.
Office Action for Korean Application No. 2020-7002337 dated Mar. 17, 2022, 10 pages.
CATT, "Consideration on Access Control Mechanism", 3GPP TSG RAN WG2 Meeting Ad Hoc, R2-1700216, (Jan. 17-19, 2017), 3 pages.
Decision to Grant for Russian Application No. 2020105917/07 dated Apr. 26, 2021, 17 pages.

(56) References Cited

OTHER PUBLICATIONS

Notice of Allowance for Taiwanese Application No. 107128003 dated Mar. 31, 2020, 3 pages.
Office Action for Chinese Application No. 201880063423.4 dated Mar. 10, 2022, 17 pages.
Office Action for Taiwanese Application No. 107128003 dated Mar. 21, 2019, 12 pages.
Office Action for Indonesian Application No. P00202001186 dated Jul. 28, 2022, 8 pages.
Office Action for Singapore Application No. 11202001072W dated Aug. 15, 2022, 10 pages.
Office Action for ARIPO Application No. AP/P/2020/012208 dated Sep. 1, 2022, 4 pages.
Notice of Allowance for ARIPO Application No. AP/P/2020/012208 dated Feb. 15, 2023, 5 pages.
Notice of Acceptance for Chilean Application No. 2020-000314 dated May 5, 2023, 2 pages.
Notice of Allowance for Indonesian Application No. P00202001186 dated Feb. 17, 2023, 4 pages.
Office Action for Japanese Application No. 2022-112317 dated Jun. 8, 2023, 4 pages.
Notice of Allowance for Singapore Application No. 11202001072W dated Jun. 13, 2023, 6 pages.
Dismissal of Amendment for Korean Application No. 2022-7002337 dated May 12, 2023, 3 pages.
Office Action for Korean Application No. 2022-7002337 dated May 18, 2023, 4 pages.
"3rd Generation Partnership Project; Technical Specification Group Core Network and Terminals; Non-Access-Stratum (NAS) protocol for 5G System (5GS); Stage 3 (Release 15)", 3GPP TS 24.501 v15.0.0, (Jun. 2018), 338 pages.
"3rd Generation Partnership Project; Technical Specification Group Core Network and Terminals; Non-Access-Stratum (NAS) protocol for Evolved Packet System (EPS); Stage 3 (Release 14)", 3GPP TS 24.301 v14.4.0, (Jun. 2017), 486 pages.
"3rd Generation Partnership Project; Technical Specification Group Services and System Aspects; Study on Architecture for Next Generation System (Release 14)", 3GPP TR 23.799 v0.7.0, (Aug. 2016), 323 pages.
"3rd Generation Partnership Project; Technical Specification Group Services and System Aspects; System Architecture for the 5G System; Stage 2 (Release 15)", 3GPP TS 23.501 v0.3.0, (Feb. 2017), 97 pages.
Decision of Refusal for Japanese Application No. 2020-507627 dated Sep. 12, 2022, 2 pages.
Decision to Grant for Chinese Application No. 201880063423.4 dated Oct. 28, 2022, 3 pages.
Ericsson, "Access Control and Resource Isolation for Slicing", 3GPP TSG-RAN WG2 #97bis, Tdoc R2-1702553, (Apr. 3-7, 2017), 2 pages.
Ericsson, "Access Control for NR", 3GPP TSG-RAN WG2 #97bis, Tdoc R2-1702865, (Apr. 3-7, 2017), 5 pages.
Ericsson, "Slicing for LTE Connected to 5G-CN", 3GPP TSG-RAN WG2 #98, Tdoc R2-1704174, (May 15-19, 2017), 4 pages.
Intel Corporation, "5G Access Control Mechanism", 3GPP TSG RAN WG2 Meeting #98, R2-1704779, (May 15-19, 2017), 6 pages.
Intel Corporation, "Discussion on 5G Access Control", 3GPP TSG-SA WG1 Meeting #79, S1-173098, (Aug. 21-25, 2017), 5 pages.
Media Tek Inc., "Discussion on Unified Access Control in 5GS", 3GPP TSG CT WG1 Meeting #103, C1-171579, (Apr. 3-7, 2017), 5 pages.
Notice of Acceptance for South Africa Application No. 2020/00750 dated Aug. 8, 2022, 1 page.
Office Action for Canadian Application No. 3,072,743 dated Nov. 28, 2022, 7 pages.
Office Action for Chilean Application No. 202000314 dated Nov. 11, 2022, 60 pages.
Office Action for Colombian Application No. NC2020/0001475 dated Nov. 30, 2022, 22 pages.
Office Action for Korean Application No. 10-2022-7002337 dated Nov. 23, 2022, 6 pages.
Office Action for Australian Application No. 2021254647 dated Jul. 11, 2023, 3 pages.
Office Action for Mexico Application No. MX/a/2020/001682 dated Jun. 30, 2023, 10 pages.
Office Action for Vietnamese Application No. 1-2020-00749 dated Aug. 4, 2023, 3 pages.
Huawei et al., "Access Control in RRC_INACTIVE", 3GPP TSG-RAN WG2 Meeting #98, R2-1705184, (May 15-19, 2017), 2 pages.
Huawei et al., "Radio Resource Management for Network Slicing", 3GPP TSG-RAN WG2 NR Ad Hoc, R2-1700101, (Jan. 17-19, 2017), 4 pages.
MediaTek Inc., "Discussion on Principles for Unified Access Control", 3GPP TSG-CT WG1 Meeting #104, C1-172279, (May 15-19, 2017), 4 pages.
Office Action for Canadian Application No. 3,072,743 dated Nov. 21, 2023, 3 pages.
Office Action for European Application No. 18844187.7 dated Oct. 30, 2023, 7 pages.
Office Action for Japanese Application No. 2022-112317 dated Oct. 23, 2023, 7 pages.
Notice of Allowance for Vietnamese Application No. 1-2020-00749 dated Apr. 2, 2024, 2 pages.
Office Action for Brazilian Application No. BR112020002801-0 dated Feb. 28, 2024, 8 pages.
Office Action for Indonesian Application No. P00202201280 dated Feb. 27, 2024, 8 pages.
Decision to Grant for Japanese Application No. 2022-112317 dated May 27, 2024, 4 pages.
Notice of Acceptance for Australian Application No. 2021254647 dated Jul. 12, 2024, 3 pages.

* cited by examiner

NETWORK SLICE-SPECIFIC ACCESS BARRING FOR WIRELESS NETWORKS

CROSS-REFERENCE TO RELATED APPLICATIONS

This application is a national phase entry of International Application No. PCT/FI2018/050570, filed Aug. 2, 2018, which claims the benefit to U.S. Provisional Application No. 62/544,519, filed Aug. 11, 2017, the entire contents of which are incorporated herein by reference.

TECHNICAL FIELD

This description relates to communications.

BACKGROUND

A communication system may be a facility that enables communication between two or more nodes or devices, such as fixed or mobile communication devices. Signals can be carried on wired or wireless carriers.

An example of a cellular communication system is an architecture that is being standardized by the 3$^{rd}$ Generation Partnership Project (3GPP). A recent development in this field is often referred to as the long-term evolution (LTE) of the Universal Mobile Telecommunications System (UMTS) radio-access technology. E-UTRA (evolved UMTS Terrestrial Radio Access) is the air interface of 3GPP's LTE upgrade path for mobile networks. In LTE, base stations or access points (APs), which are referred to as enhanced Node AP (eNBs), provide wireless access within a coverage area or cell. In LTE, mobile devices, or mobile stations are referred to as user equipments (UE). LTE has included a number of improvements or developments.

A global bandwidth shortage facing wireless carriers has motivated the consideration of the underutilized millimeter wave (mmWave) frequency spectrum for future broadband cellular communication networks, for example. mmWave (or extremely high frequency) may, for example, include the frequency range between 30 and 300 gigahertz (GHz). Radio waves in this band may, for example, have wavelengths from ten to one millimeters, giving it the name millimeter band or millimeter wave. The amount of wireless data will likely significantly increase in the coming years. Various techniques have been used in attempt to address this challenge including obtaining more spectrum, having smaller cell sizes, and using improved technologies enabling more bits/s/Hz. One element that may be used to obtain more spectrum is to move to higher frequencies, e.g., above 6 GHz. For fifth generation wireless systems (5G), an access architecture for deployment of cellular radio equipment employing mmWave radio spectrum has been proposed. Other example spectrums may also be used, such as cmWave radio spectrum (e.g., 3-30 GHz).

In addition, 5G wireless networks may support network slicing, wherein a single physical network may be sliced into multiple virtual networks. Each network slice may include a set of logical network functions that may support the requirements of a particular use case.

SUMMARY

According to an example implementation, a method includes: detecting, by a user device, a network slice associated with an access attempt by the user device to access a wireless network; and, making, by the user device, a barring decision for the access attempt based on the network slice associated with the access attempt.

According to an example implementation, an apparatus includes at least one processor and at least one memory including computer instructions that, when executed by the at least one processor, cause the apparatus to: detect, by a user device, a network slice associated with an access attempt by the user device to access a wireless network; and, make, by the user device, a barring decision for the access attempt based on the network slice associated with the access attempt.

According to an example implementation, a computer program product includes a computer-readable storage medium and storing executable code that, when executed by at least one data processing apparatus, is configured to cause the at least one data processing apparatus to perform a method including: detecting, by a user device, a network slice associated with an access attempt by the user device to access a wireless network; and, making, by the user device, a barring decision for the access attempt based on the network slice associated with the access attempt.

According to an example implementation, a method includes: receiving, by a base station from one or more core network entities within a wireless network, network slice-specific load information that indicates a load for each of one or more network slices; determining, by the base station based on the received network slice-specific load information, a barring configuration that indicates a set of barring parameters for one or more access categories; and sending, by the base station to a user device, the barring configuration to reduce a load on the wireless network.

According to an example implementation, an apparatus includes at least one processor and at least one memory including computer instructions that, when executed by the at least one processor, cause the apparatus to: receive, by a base station from one or more core network entities within a wireless network, network slice-specific load information that indicates a load for each of one or more network slices; determine, by the base station based on the received network slice-specific load information, a barring configuration that indicates a set of barring parameters for one or more access categories; and send, by the base station to a user device, the barring configuration to reduce a load on the wireless network.

According to an example implementation, a computer program product includes a computer-readable storage medium and storing executable code that, when executed by at least one data processing apparatus, is configured to cause the at least one data processing apparatus to perform a method including: receiving, by a base station from one or more core network entities within a wireless network, network slice-specific load information that indicates a load for each of one or more network slices; determining, by the base station based on the received network slice-specific load information, a barring configuration that indicates a set of barring parameters for one or more access categories; and sending, by the base station to a user device, the barring configuration to reduce a load on the wireless network.

According to an example implementation, a method includes: determining, by a core network entity, network slice-specific load information that indicates a load for each of one or more network slices; and sending, by the core network entity to a base station, the network-slice specific load information.

According to an example implementation, an apparatus includes at least one processor and at least one memory including computer instructions that, when executed by the at least one processor, cause the apparatus to: determine, by a core network entity, network slice-specific load information that indicates a load for each of one or more network slices; and send, by the core network entity to a base station, the network-slice specific load information.

According to an example implementation, a computer program product includes a computer-readable storage medium and storing executable code that, when executed by at least one data processing apparatus, is configured to cause the at least one data processing apparatus to perform a method including: determining, by a core network entity, network slice-specific load information that indicates a load for each of one or more network slices; and sending, by the core network entity to a base station, the network-slice specific load information. The details of one or more examples of implementations are set forth in the accompanying drawings and the description below. Other features will be apparent from the description and drawings, and from the claims.

DETAILED DESCRIPTION

Figure 1:
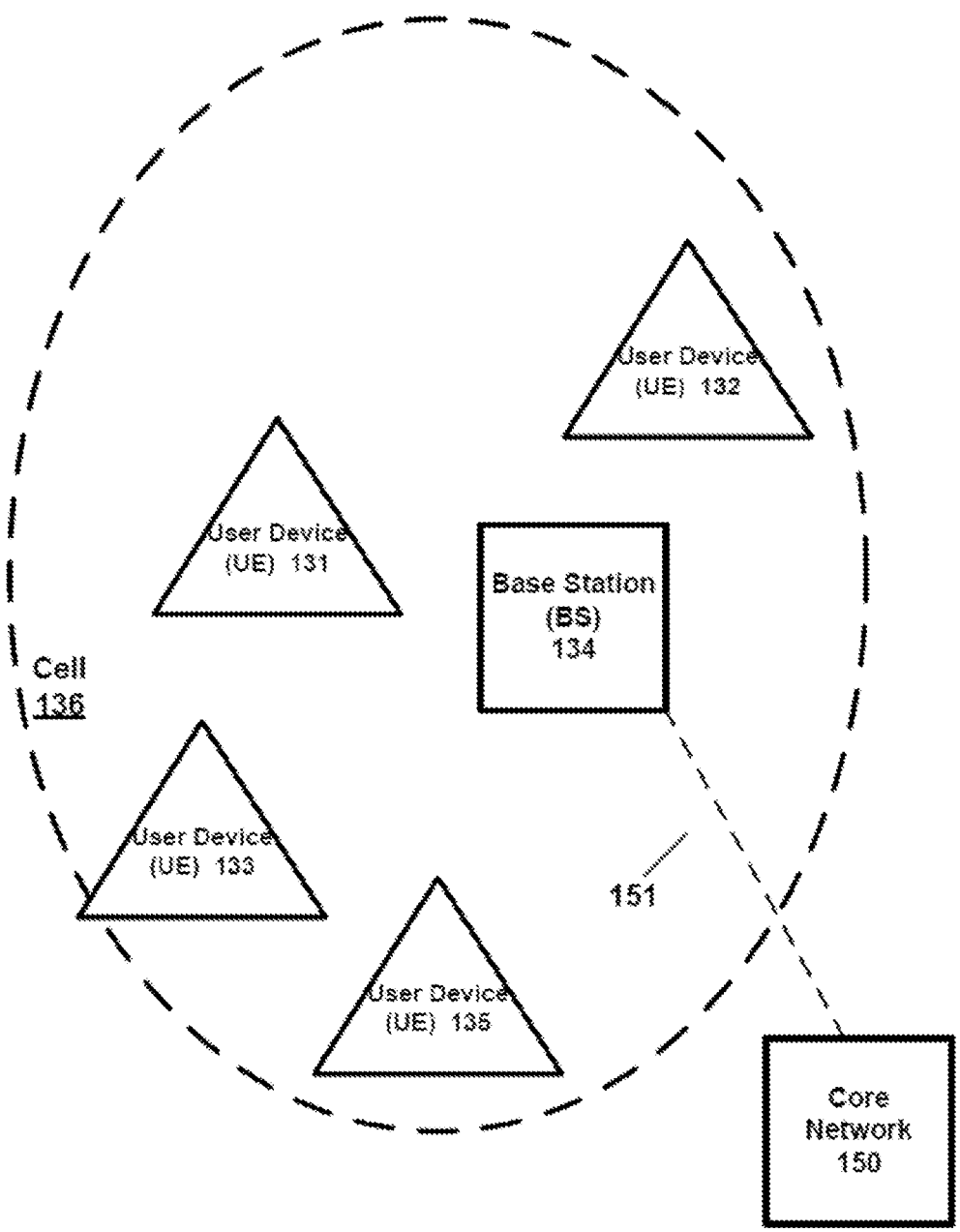
FIG. 1 is a block diagram of a wireless network according to an example implementation.

FIG. 1 is a block diagram of a wireless network 130 according to an example implementation. In the wireless network 130 of FIG. 1, user devices 131, 132, 133 and 135, which may also be referred to as mobile stations (MSs) or user equipment (UEs), may be connected (and in communication) with a base station (BS) 134, which may also be referred to as an access point (AP), an enhanced Node B (eNB), a gNB (which may be a 5G base station) or a network node. At least part of the functionalities of an access point (AP), base station (BS) or (e)Node B (eNB) may be also be carried out by any node, server or host which may be operably coupled to a transceiver, such as a remote radio head. BS (or AP) 134 provides wireless coverage within a cell 136, including to user devices 131, 132, 133 and 135. Although only four user devices are shown as being connected or attached to BS 134, any number of user devices may be provided. BS 134 is also connected to a core network 150 via an interface 151. This is merely one simple example of a wireless network, and others may be used.

A user device (user terminal, user equipment (UE)) may refer to a portable computing device that includes wireless mobile communication devices operating with or without a subscriber identification module (SIM), including, but not limited to, the following types of devices: a mobile station (MS), a mobile phone, a cell phone, a smartphone, a personal digital assistant (PDA), a handset, a device using a wireless modem (alarm or measurement device, etc.), a laptop and/or touch screen computer, a tablet, a phablet, a game console, a notebook, and a multimedia device, as examples. It should be appreciated that a user device may also be a nearly exclusive uplink only device, of which an example is a camera or video camera loading images or video clips to a network.

In LTE (as an example), core network 150 may be referred to as Evolved Packet Core (EPC), which may include a mobility management entity (MME) which may handle or assist with mobility/handover of user devices between BSs, one or more gateways that may forward data and control signals between the BSs and packet data networks or the Internet, and other control functions or blocks.

The various example implementations may be applied to a wide variety of wireless technologies, wireless networks, such as LTE, LTE-A, 5G (New Radio, or NR), cmWave, and/or mmWave band networks, or any other wireless network or use case. LTE, 5G, cmWave and mmWave band networks are provided only as illustrative examples, and the various example implementations may be applied to any wireless technology/wireless network. The various example implementations may also be applied to a variety of different applications, services or use cases, such as, for example, ultra-reliability low latency communications (URLLC), Internet of Things (IoT), enhanced mobile broadband, massive machine type communications (MMTC), vehicle-to-vehicle (V2V), vehicle-to-device, etc. Each of these use cases, or types of UEs, may have its own set of requirements.

In addition, 5G wireless networks may support network slicing, wherein a single physical network may be sliced into multiple virtual networks. Each network slice may include, for example, a set of logical network functions that may support the requirements of a particular use case. Network Slicing may allow differentiated treatment depending on requirements of different UEs or groups of UEs. With slicing (network slicing), an operator can create networks for optimized solutions based on different service requirements, QoS (quality of service), functionality, performance, etc. By way of illustrative example, a network slice may include, for example, a portion of one or more network resources at one or more network entities, such as a portion of, e.g., one or more of computational resources, memory resources, hardware resources, software or functional resources, and/or other network resources at a BS and/or at one or more core network entities, for example, that may support a group of UEs or support a particular use case.

According to an example implementation, a UE and/or group of UEs, e.g., with similar QoS requirements or running the same or similar application, providing a common feature or functionality, for a particular use case, or other common aspect, may support a network slice or may be allocated or assigned to a network slice, e.g., where a network slice identifier (or slice identifier) may identify the network slice. However, different UEs (e.g., different type of UEs) and/or each different group of UEs, which may be assigned to different network slices, may have different service requirements. According to an example implementation, different UEs and/or each of multiple groups of UEs may be assigned to a different network slice.

Furthermore, a UE may have a number of different applications and/or data flows (e.g., protocol data unit sessions) that may generate and/or receive traffic or data. Therefore, a UE may be allocated to multiple network slices, e.g., based on different types of traffic that may be transmitted to or from the UE, different applications running on a UE, or different use cases that the UE may support. Therefore, a UE may be allocated to or allowed to use a plurality of network slices.

According to an example implementation, a slice may be identified by a slice identifier, which may include one or more of the following: a slice/service type (SST); a slice/service type (SST) and slice differentiator (SD); and a single Network Slice Selection Assistance Information (S-NSSAI). For example a SST may indicate a service type, such as a specific 5G wireless service type, such as ultra-reliability low latency communications (URLLC), Internet of Things (IoT), enhanced mobile broadband (eMBB), massive machine type communications (MMTC), etc. Thus, for example, a network slice may be allocated to or associated with a specific service type. A slice differentiator (SD) may further allow a differentiation between different slices of the same type (e.g., to allow differentiation between two URLLC network slices that may be assigned to different groups of URLLC UEs, for example). Also, according to an example implementation, a S-NSSAI may be another type of slice identifier. According to an example implementation, a S-NSSAI=SST+SD (e.g., S-NSSAI may include or may be a combination of or concatenation of a SST and a SD for a slice), for example.

As noted, each of the different wireless service types (e.g., URLLC, IoT, eMBB, mMTC) may have different requirements in terms of, e.g., latency, QoS, minimum data rates, etc. As a result, in some cases, different wireless services/service types (e.g., URLLC, IoT, eMBB, mMTC) may be prioritized for service differently by a wireless network. Because each network slice may be associated with or allocated to a specific wireless service type (e.g., URLLC, IoT, eMBB, mMTC), this means that, at least in some cases, a wireless network may prioritize some network slices over other network slices.

According to an example implementation, in order to acquire a radio connection, a user device (UE) may typically make an access attempt towards the RAN (radio access network, which includes a BS). In the case where a BS and/or core network are overloaded (e.g., too many UEs that are using and/or attempting to use network resources of the network and/or a threshold (e.g., 90%+) percentage of network resources are being used and/or have been allocated), the access attempt by the UE may be barred or prevented by the UE. If the access attempt by the UE is not barred, then the UE may send, for example, a RRC (radio resource control) connection request to a BS or radio access network entity, for example, in order to register and/or establish a connection (e.g., RRC connection) to the network.

Therefore, according to an example implementation, a network may impose access restrictions to UEs that are in an Idle mode (e.g., RRC_Idle mode), e.g., to prevent UEs from registering and/or establishing a RRC connection to the network. For example, a wireless network may broadcast (e.g., via system information) a barring configuration to one or more UEs. The barring configuration may, for example, indicate whether access barring is being performed for one or more access classes or access categories. For example, each UE may be assigned an access class. Also, each access attempt may be assigned an access category. The network (e.g., BS) may broadcast a barring configuration to one or more UEs that may include information indicating that access attempts associated with one or more access categories and/or access classes, for example, may be barred, and if so, provide a set of barring parameters for these one or more of the classes and/or access categories, for example.

According to an example implementation, a set of barring parameters may include, for example, a barring rate (or barring factor) and a barring time (or barring timer value). If access barring is performed (e.g., for an access class or access category), then the UE may generate a random number. If the number is, e.g., less than the barring rate (also known as the barring factor), then the access attempt is not barred, and the UE may access the network by sending the RRC connection request. If, for example, the random number generated by the UE is greater than or equal to the barring rate (or barring factor), then the access attempt is barred (at least temporarily), and the UE is not allowed to send the RRC connection request at that time, and the UE may later again re-attempt the network access after the barring timer has expired (e.g., barring timer may be initialized and begin counting down upon or around when the UE random number is determined to be greater than or equal to the barring rate, for example). Thus, after the barring time, the UE may again attempt to access the network, by generating another (a second) random number, and determining whether this second random number is less than the barring rate or barring factor. Of course, the network may be able to adjust a network load by adjusting one or more of the barring parameters. For example, the network may adjust, e.g., increase or decrease, the number or percentage of UEs successfully accessing the network by increasing the barring rate/barring factor or decreasing the barring rate/barring factor, for example. Also, network load may be adjusted by varying or adjusting the barring time (e.g., an increased barring time may reduce network load).

However, access barring typically does not account for different loads and/or priorities that may be applied to or associated with different network slices (e.g., associated with different service types). Different network slices (or slice types) may have different loads. For example, a first network slice associated with or allocated to URLLC UEs may have a 90% load, a second network slice associated with IoT UEs may have a 60% load. According to an example implementation, it may be desirable to allow the network to decrease the overall load on the network by decreasing load for the two network slices differently (e.g., based on different sets of barring parameters). Thus, for example, the network may set a barring rate for IoT UEs (of the second network slice) at a barring rate (or barring factor) of 20% (e.g., to bar or prevent, on average, 80% of the access attempts from IoT UEs), and set a barring rate for the URLLC UEs (of the first network slice) to 70% (e.g., to bar or prevent, on average, only 30% of the URLLC access attempts), e.g., in order to prioritize URLLC access attempts over IoT access attempts, while decreasing network load, for example.

Therefore, according to an example implementation, network-slice specific access barring may be performed. For example, a UE may make a barring decision for an access attempt based on a network slice associated with the access attempt.

Figure 2:
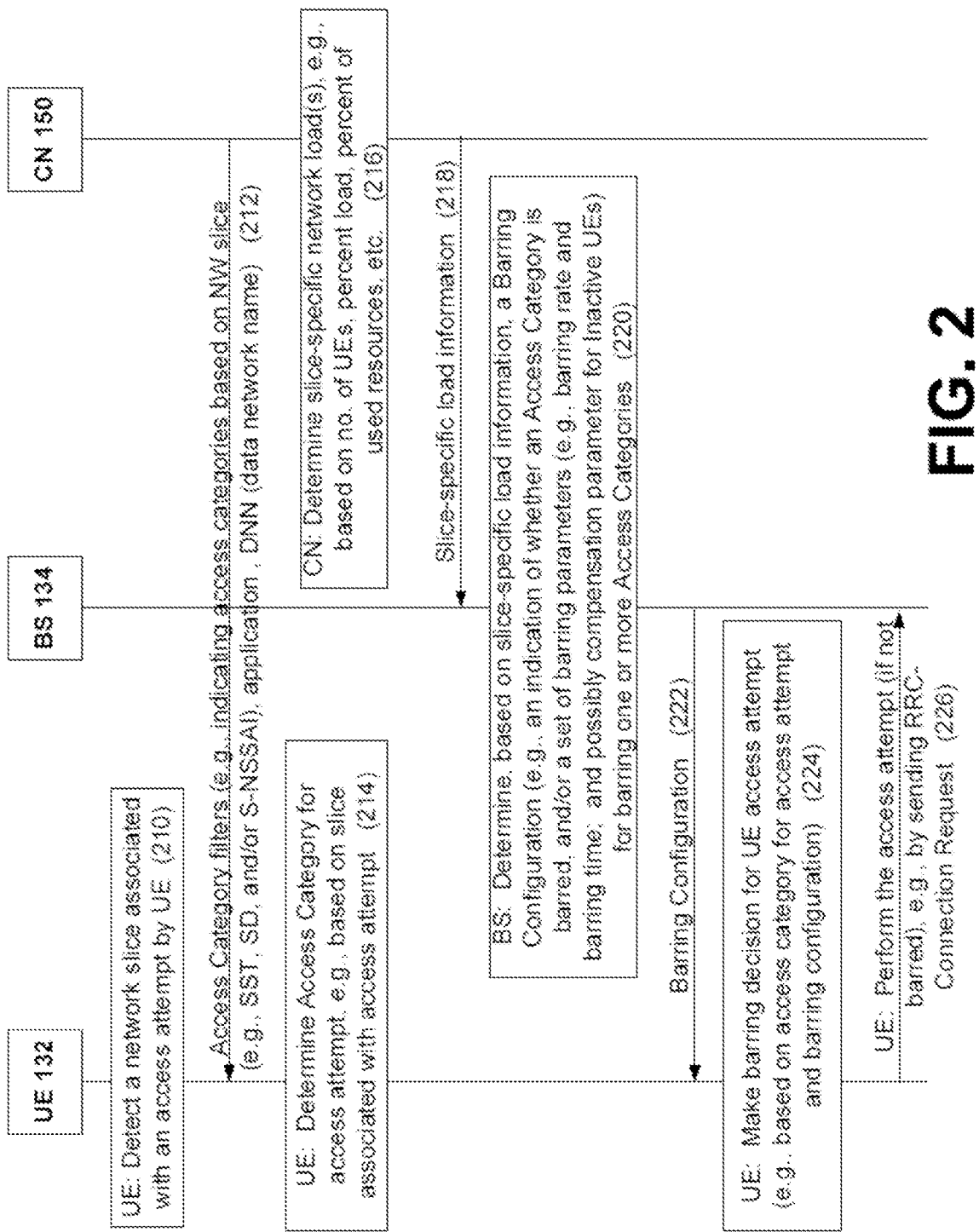
FIG. 2 is a diagram illustrating a network-specific access barring technique according to an example implementation.

FIG. 2 is a diagram illustrating a network-specific access barring technique according to an example implementation. At UE 132, BS 134 and a core network entity 150 are in communication, as shown. At 210, the UE 132 detects a network slice associated with an access attempt by the UE. As noted, the UE may be assigned to or associated with one or more network slices, e.g., a different network slice for each of multiple 5G service types. The UE 132 may detect for which slice(s), e.g., for which application(s) or service type(s), is generating the access attempt for the UE, for example.

At 212, the core network entity 150 may send to UE 132 one or more access category filters that indicate an access category associated with one or more network slices. For example, the access category filters may indicate: access category X for network slice #1 (URLLC); and access category Y for network slice #2 (IoT). These are merely a couple of illustrative example access category filters, which may allow the UE 132 to determine an access category for an access attempt based on the slice associated with the access attempt. As noted below, different access categories may be treated differently for access barring, e.g., in order to prioritize access attempts for certain slices over access attempts for other slices, for example. For example, access category X (for URLLC) may be prioritized (e.g., a reduced amount of barring for access category X) over access category Y (e.g., a higher amount of barring of access attempts for access category Y).

At 214, the UE 132 may determine an access category for the access attempt based on the slice for the access attempt and the access category filters.

At 216, the core network entity 150 may determine a slice-specific network load(s) for each of one or more network slices. Load may be measured or determine as, e.g., number of UEs, amount of traffic, percentage or amount of resources for the network slice that are used or allocated, etc. Thus, the core network entity 150 may separately determine a load for each of one or more network slices.

At 218, the core network entity 150 may send to the BS 134 the slice-specific load information for one or more network slices.

At 220, the BS 134 may determine, based on the slice-specific load information, a barring configuration, e.g., which may indicate for one or more access categories: whether the access category is subject to barring, and providing a set of barring parameters for the access category (e.g., a barring rate or barring factor, and a barring time, as described above). Also, a barring configuration may include a compensation factor to adjust (e.g., reduce) a barring of access attempts from Inactive UEs.

According to an example implementation, a UE may be Connected (and active); Idle (not connected), or Connected (connected to the core network entity) but Inactive (Inactive Mode). In an example of Inactive mode, the core network determines that the UE is connected, and thus does not page the Inactive UE, but rather, just sends any downlink data to the BS for delivery to the Inactive UE. The BS may then page the Inactive UE to cause the UE to establish a connection (if not barred from access) and receive the downlink data for the Inactive UE. According to an example implementation, a compensation factor may be used to adjust a barring rate for Inactive UEs. For example, the compensation factor may be provided and used by the UE in making a barring decision that may provide fewer barred access attempts for Inactive mode UEs, as compared to Idle mode UEs (e.g., a lower rate of barring of access attempts for Inactive mode UEs, as compared to a higher rate of barring of access attempts from Idle mode UEs, for example).

At 222, the barring configuration may be sent from the BS 134 to the UE 132.

At 224, the UE 132 may make a barring decision for the UE access attempt based on the network slice associated with the access attempt. For example, the UE 132 may make a barring decision based on the access category for the UE access category (which is based on the slice for the access attempt) and the barring configuration (e.g., which may indicate whether access barring is being performed for such access category, and/or provide a set of barring parameters (e.g., a barring rate or barring factor, and a barring time, and possibly a compensation factor for Inactive mode UEs to adjust barring decision making if the UE is an Inactive mode) for the access category that may provide parameters for the UE to make the access barring decision for the UE access attempt.

For example, UE 132 may generate a random number and compare it to the received barring rate or barring factor. If the random number is less than (or alternatively, greater than) the barring rate or barring factor, then the access attempt is not barred. If, on the other hand, the random number generated by the UE is greater than or equal to (or alternatively, less than or equal to) the barring rate or barring factor, then the UE access attempt is (at least temporarily) barred or prevented from occurring.

At 226, if the UE access attempt is not barred, then the UE may perform the access attempt (to access the network), e.g., by sending a RRC connection request message to the BS 134. If the access attempt is barred, then the UE may wait an amount of time based on the barring time (a backoff time), and then may generate a second random number, and compare it to the barring rate or barring factor again, to determine if the second access attempt is also barred. This process may continue, e.g., with the UE 132 repeatedly receiving an indication of a UE access attempt associated with a particular network slice, and then determining (e.g., based on the slice associated with the access attempt, and/or based on the slice-specific barring configuration and/or slice-specific access category filters) if the access attempt is barred or not.

Example 1

Figure 3:
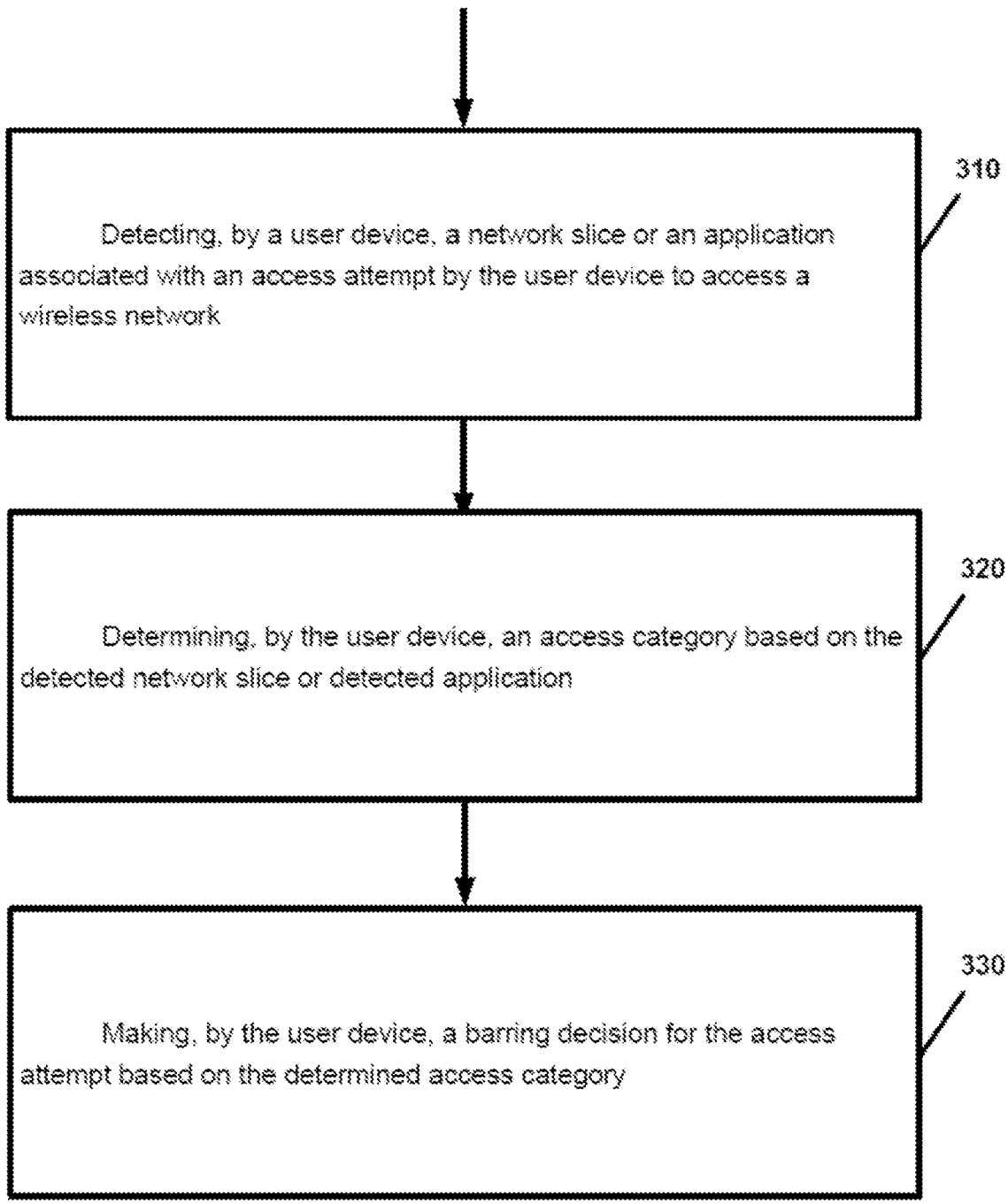
FIG. 3 is a flow chart illustrating operation of a user device according to an example implementation.

FIG. 3 is a flow chart illustrating operation of a user device according to an example implementation. Operation 310 includes detecting, by a user device, a network slice or an application associated with an access attempt by the user device to access a wireless network. Operation 320 includes determining, by the user device, an access category based on the detected network slice or detected application. Operation 330 includes making, by the user device, a barring decision for the access attempt based on the network slice associated with the access attempt.

Example 2

According to an example implementation of example 1, wherein the making a barring decision comprises: making, by the user device based on the network slice associated with the access attempt, a decision that the access attempt is not barred; and the method further comprising performing, by the user device based on the decision, the detected access attempt to the wireless network.

Example 3

According to an example implementation of any of examples 1-2, wherein the performing the detected access attempt comprises: sending, by the user device, a radio resource control (RRC) connection request message to request a connection to the wireless network.

Example 4

According to an example implementation of any of examples 1-3, and further comprising: receiving, by the user device, one or more access category filters that indicate an access category associated with one or more network slices or applications; determining, by the user device, an access category for the access attempt based on the network slice or application that is associated with the access attempt and the one or more access category filters; receiving, by the user device, a barring configuration that indicates a set of barring parameters for one or more of the access categories; and wherein the making a barring decision comprises making, by the user device, a barring decision for the access attempt based on the barring configuration and the access category for the access attempt.

Example 5

According to an example implementation of any of examples 1-4, wherein the network slice associated with the access attempt comprises one or more of the following: a slice/service type (SST); a slice/service type (SST) and slice differentiator (SD); a single Network Slice Selection Assistance Information (S-NSSAI).

Example 6

According to an example implementation of any of examples 1-5, wherein the barring configuration that indicates a set of barring parameters for one or more of the access categories comprises a barring configuration that indicates a set of barring parameters for one or more of the access categories and one or more applications.

Example 7

The method of any of claims 1-6 wherein the application associated with the access attempt is identified by one or more of the following: operating system identity; and operating system application identity.

Example 8

According to an example implementation of any of examples 1-7, wherein the barring configuration indicates a set of barring parameters, including at least a barring rate and a barring timer, for one or more of the access categories.

Example 9

According to an example implementation of any of examples 1-8, and further comprising: receiving a compensation parameter for a user device in Inactive mode; determining, by the user device, that the user device is in Inactive mode; and wherein the making a barring decision comprises: applying, by the user device, the compensation parameter to the making a barring decision for the user device to adjust a barring rate of the access attempt of the user device that is in Inactive mode.

Example 10

According to an example implementation of any of examples 1-9, wherein the barring configuration is based on a network slice-specific load information that indicates a network load for each of one or more network slices.

Example 11

According to an example implementation of any of examples 1-10, wherein the barring configuration that indicates a set of barring parameters for one or more of the access categories provides or indicates a different prioritization of one or more access attempts based on access categories of the access attempts.

Example 12

Figure 4:
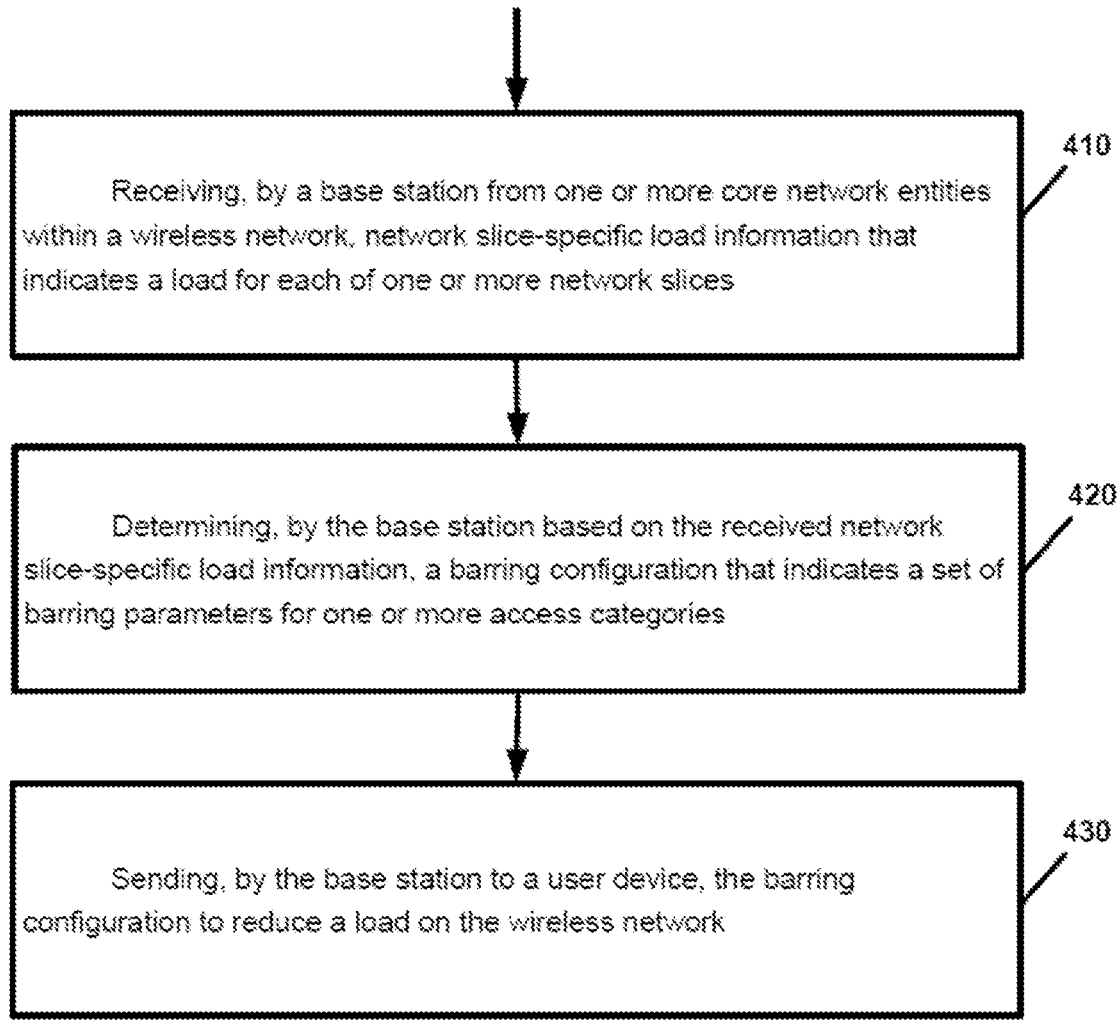
FIG. 4 is a flow chart illustrating operation of a base station according to an example implementation.

FIG. 4 is a flow chart illustrating operation of a base station according to an example implementation. Operation 410 includes receiving, by a base station from one or more core network entities within a wireless network, network slice-specific load information that indicates a load for each of one or more network slices. Operation 420 includes determining, by the base station based on the received network slice-specific load information, a barring configuration that indicates a set of barring parameters for one or more access categories. Operation 430 includes sending, by the base station to a user device, the barring configuration to reduce a load on the wireless network.

Example 13

According to an example implementation of example 12, wherein the sending comprises sending, by the base station to a user device, the barring configuration, to allow the user device to make a barring decision for an access attempt based on a network slice associated with the access attempt by the user device.

Example 14

According to an example implementation of any of examples 12-13, and further comprising: forwarding, by the base station to the user device, one or more access category filters that indicate an access category associated with one or more network slices.

Example 15

According to an example implementation of any of examples 12-14, wherein the barring configuration indicates a set of barring parameters, including at least a barring rate and a barring timer, for one or more of the access categories.

Example 16

According to an example implementation of any of examples 12-15, wherein the one or more network slices are identified by or associated with one or more of the following: a slice/service type (SST); a slice/service type (SST) and slice differentiator (SD); and a single Network Slice Selection Assistance Information (S-NSSAI).

Example 17

Figure 5:
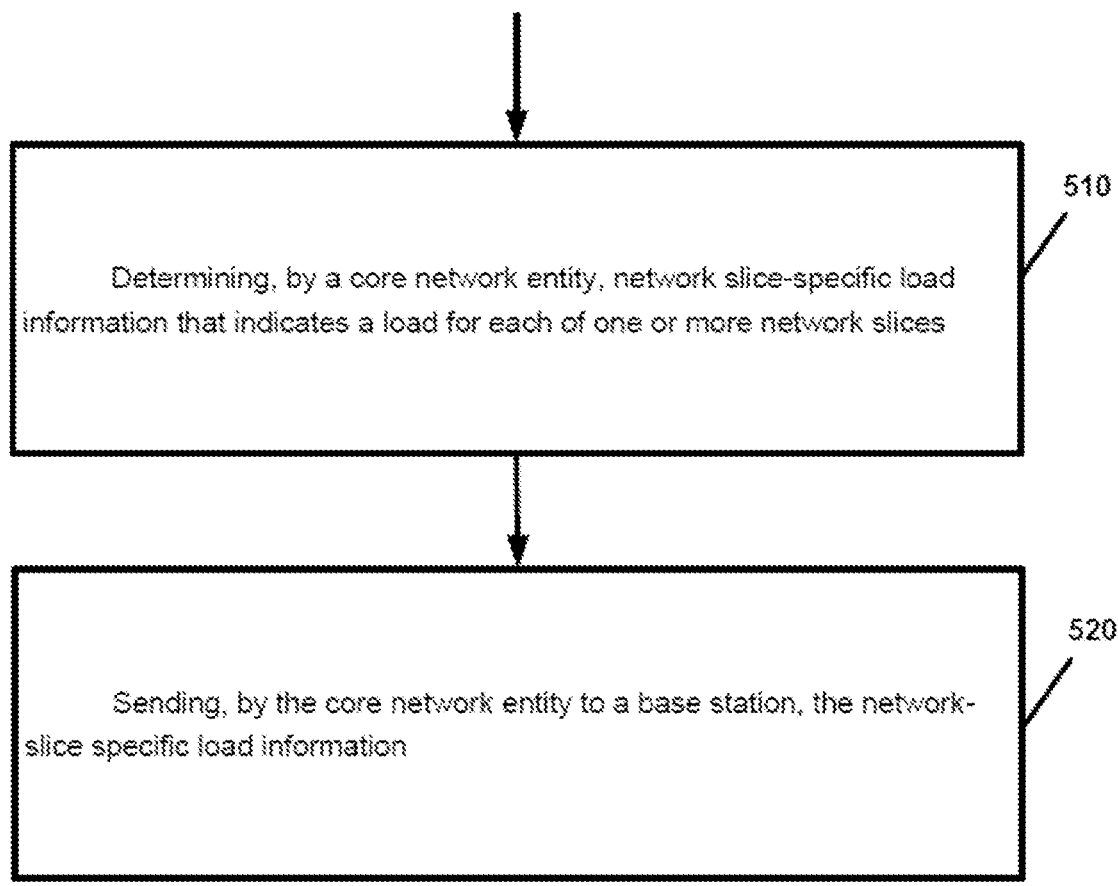
FIG. 5 is a flow chart illustrating operation of a core network entity according to an example implementation.

FIG. 5 is a flow chart illustrating operation of a core network entity according to an example implementation. Operation 510 includes determining, by a core network entity, network slice-specific load information that indicates a load for each of one or more network slices. Operation 520 includes sending, by the core network entity to a base station, the network-slice specific load information.

Example 18

According to an example implementation of example 17, wherein the core network entity comprises a first core network entity, and wherein the network slice-specific load information is determined by the first core network entity from one or more of the following: network slice-specific load information determined or gathered by the first core network entity; and network slice-specific load information received from a second core network entity.

Example 19

According to an example implementation of any of examples 17-18, and further comprising: sending, by the core network entity to a user device via a base station, one or more access category filters that indicate an access category associated with one or more network slices.

Example 20

According to an example implementation of any of examples 17-19, wherein the one or more network slices are identified by or associated with one or more of the following: a slice/service type (SST); a slice/service type (SST) and slice differentiator (SD); and a single Network Slice Selection Assistance Information (S-NSSAI).

Example 21

An apparatus comprising means for performing a method of any of examples 1-20.

Example 22

An apparatus comprising at least one processor and at least one memory including computer instructions that, when executed by the at least one processor, cause the apparatus to perform a method of any of examples 1-20.

Example 23

An apparatus comprising a computer program product including a non-transitory computer-readable storage medium and storing executable code that, when executed by at least one data processing apparatus, is configured to cause the at least one data processing apparatus to perform a method of any of examples 1-20.

Further example implementations and/or example details will now be provided.

Figure 6:
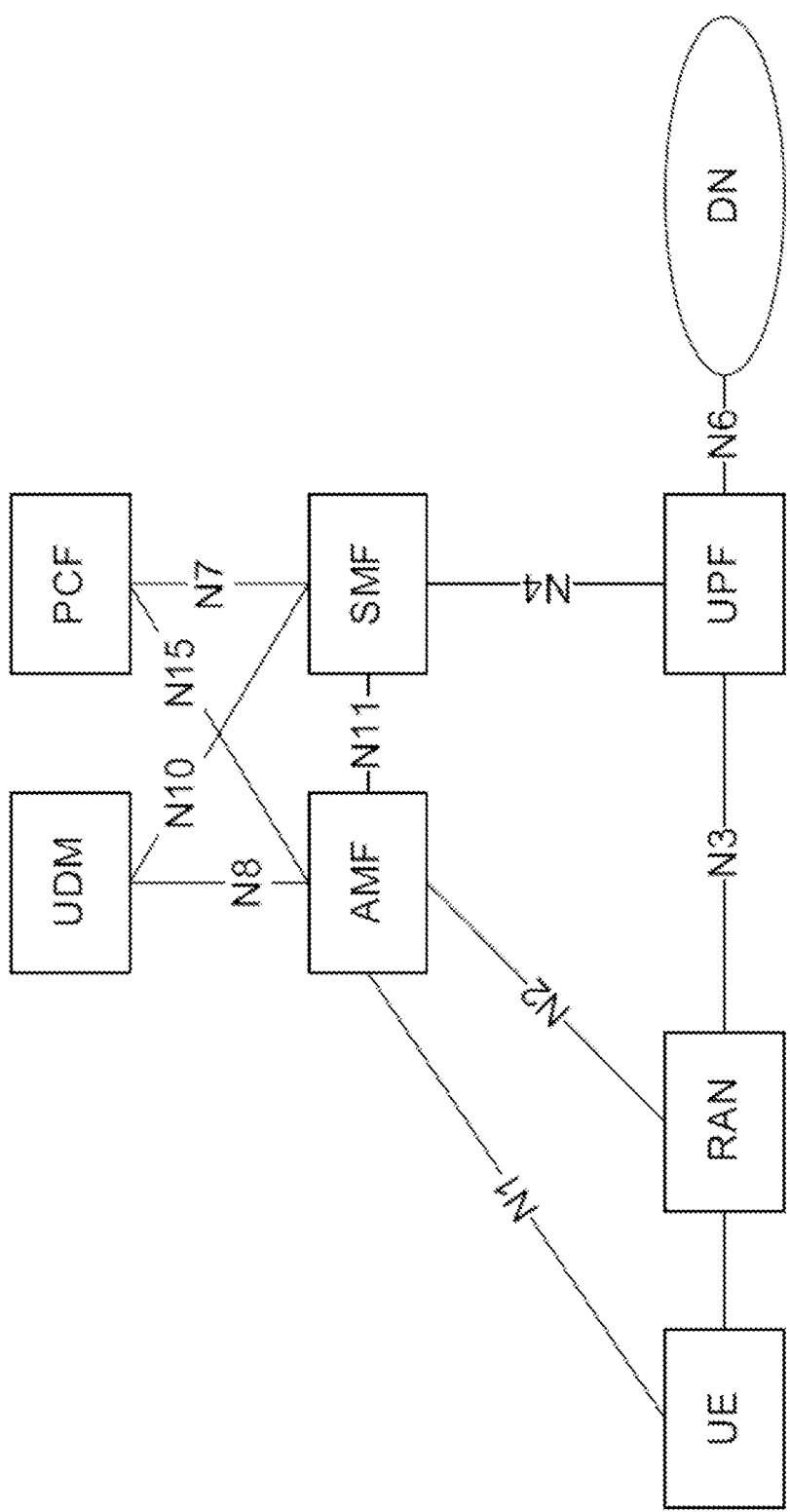
FIG. 6 is a diagram illustrating a network according to an example implementation.

FIG. 6 is a diagram illustrating a network according to an example implementation. The figure above shows a part of 5GS architecture in reference point representation. The UE is served by a RAN node (BS) in RAN and by an AMF and an SMF in the core network. Once the UE is registered to the network, the UE can communicate with a DN via a PDU session: a data path is established through RAN and UPF towards a DN. A UE's registration, mobility, and sessions are managed by core network control plane network functions: AMF and SMF. In addition, a UE's subscription is stored in the UDM and the UE's policy (e.g. mobility restriction) is controlled by the PCF.

When the UE would like to be served by the network, the UE needs to acquire radio connection and register to the core network. In order to acquire radio connection, the UE makes an access attempt towards the RAN (but first the UE must confirm that the access attempt is not barred. In case the RAN and/or core network are overloaded, the access attempt may be barred by the UE. In an example implementation, the UE may bar an access attempt according to the characteristics of the access attempt and barring configuration broadcasted by the RAN node, and possibly other information. However, a traditional access barring does not take into account slices, slice-related information, or slice-specific load information.

Therefore, according to an example implementation, network-slice specific access barring may be performed. For example, a UE may make a barring decision for an access attempt based on a network slice associated with the access attempt.

According to an example implementation, a load report may be sent from the core network (e.g., AMF and/or SMF) to RAN/BS; barring configuration for RRC-inactive (and connected) UEs as opposed to connected and active UEs, and idle; connected mode UEs are not barred usually; idle mode UEs should be barred most, and inactive connected UEs should be barred less than Idle mode UEs, because CN believes these UEs are connected. So these inactive UEs receive some additional access barring configuration parameters (e.g., the compensation parameter). A barring configuration may be determined by BS based on load information, and sent to UE.

A 5GMM entity of UE may collect one or more of the following information from other entities in the UE:
start and stop of MMTel video, MMTel voice, SMSoIP services from the IMS entity; request of SMSoNAS delivery from the SMS entity; and
indication whether the 5GSM request is related to emergency PDU session from the 5GSM entity. Then, the 5GMM of UE entity decides the access category of an access attempts by making use of information available to itself in addition to the above information and sends the access category to the RRC layer of UE.

The RRC layer makes a barring decision for the access attempt taking into account the following factors:
barring configuration is access category specific, which is slice-specific (this barring configuration takes into account the slice specific load information; and, barring configuration transmission may be triggered by updated load information). access category from the 5GMM entity;
access class(es) of the UE; and/or
whether the access attempt is triggering change from RRC-INACTIVE to RRC-CONNECTED and, if yes, whether the access attempt is triggered by RAN-level paging.

UE decides whether access attempt is barred or not barred based on information coming from BS—if barred, then UE goes into idle mode, and if not barred, then UE transitions from RRC Inactive to RRC Connected; in RRC, there are three different states—connected, inactive and idle (at RRC level).

The slice (e.g., SST) may be taken into account for the access category decision: 5GMM entity collects information from other entities, and the 5GMM entity may collect which slice (e.g., SST) the 5GSM access request is related to from the 5GSM entity. Additionally, SST of an already established PDU session can be available in the 5GMM entity. Thus, the 5GMM may use the SST(s) of the PDU session(s) associated with the access attempt as well. In short, the 5GMM entity may obtain SST(s) related to the access attempt from the 5GSM entity and/or from itself.

In addition, mobile or wireless operator-specific access categories can be determined: The network provides the UE (5GMM entity) with access category filter(s). The filter is associated with an operator-specific access category and has an associated precedence in relation to standard access categories.

Barring configuration determination/population by BS: The NGAP (BS) may determine or populate barring configuration according to the slice-specific load information received from the core network. The core network may indicate the slice-specific load in the core network to the RAN node. The load can be indicated per PLMN, per SST, per SD, and/or per S-NSSAI.

Figure 7:
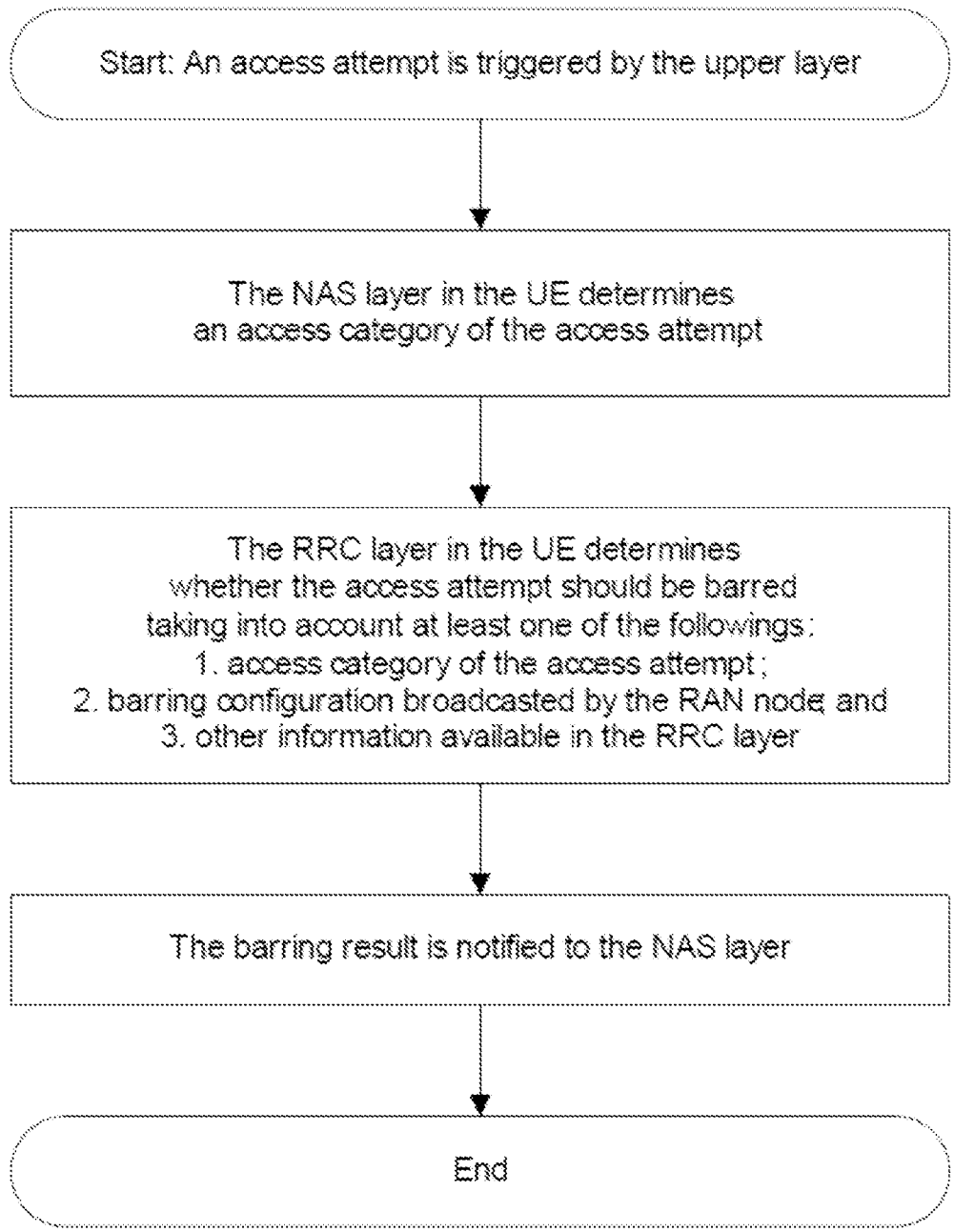
FIG. 7 is a diagram illustrating an overall procedure for access barring for the access attempts caused by an upper layer according to an example implementation.
Figure 8:
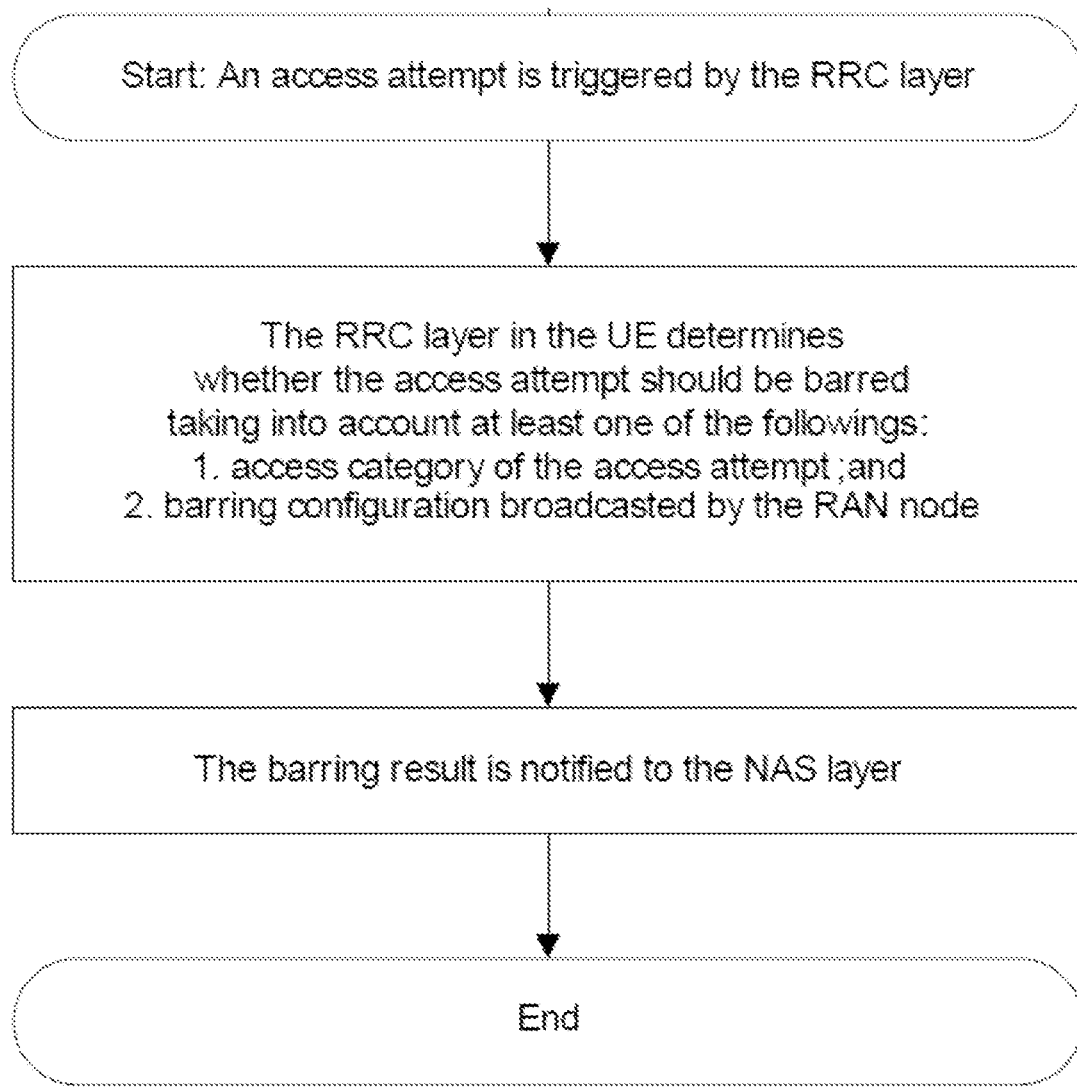
FIG. 8 is a diagram illustrating an overall procedure for access barring for access attempts triggered by the RRC layer according to an example implementation.
Figure 9:
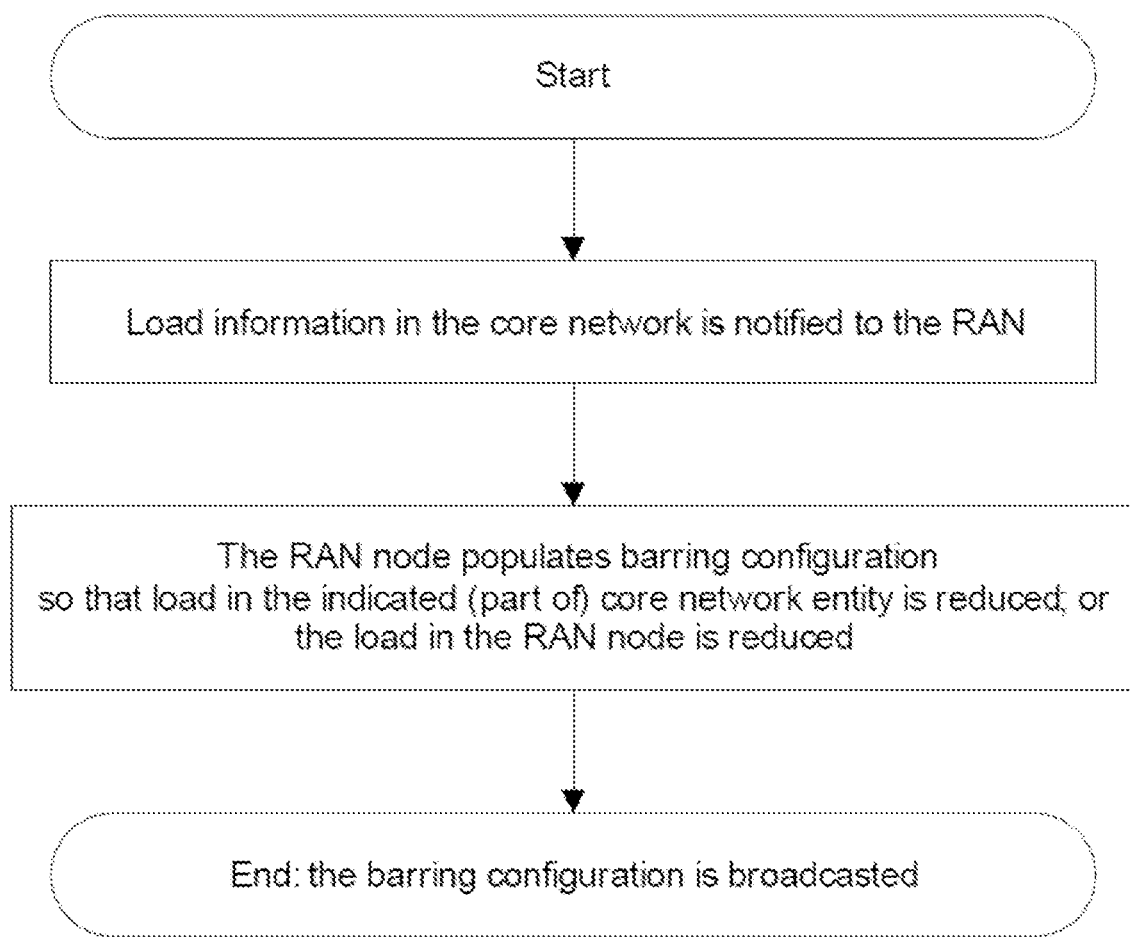
FIG. 9 is a diagram illustrating a procedure for a RAN node to set barring configuration to be broadcasted according to an example implementation.

FIG. 7 is a diagram illustrating an overall procedure for access barring for the access attempts caused by an upper layer according to an example implementation. FIG. 8 is a diagram illustrating an overall procedure for access barring for access attempts triggered by the RRC layer according to an example implementation. The RRC layer of the UE in RRC-INACTIVE mode can trigger an access attempt. The RRC layer may or may not receive an access category for the access attempt. In an example implementation, the NAS layer provides an access category for a NAS message irrespective of the RRC states. FIG. 9 is a diagram illustrating a procedure for a RAN node to set barring configuration to be broadcasted according to an example implementation. The load information of the AMF and/or SMF per network slice can be delivered to the RAN node.

Figure 10:
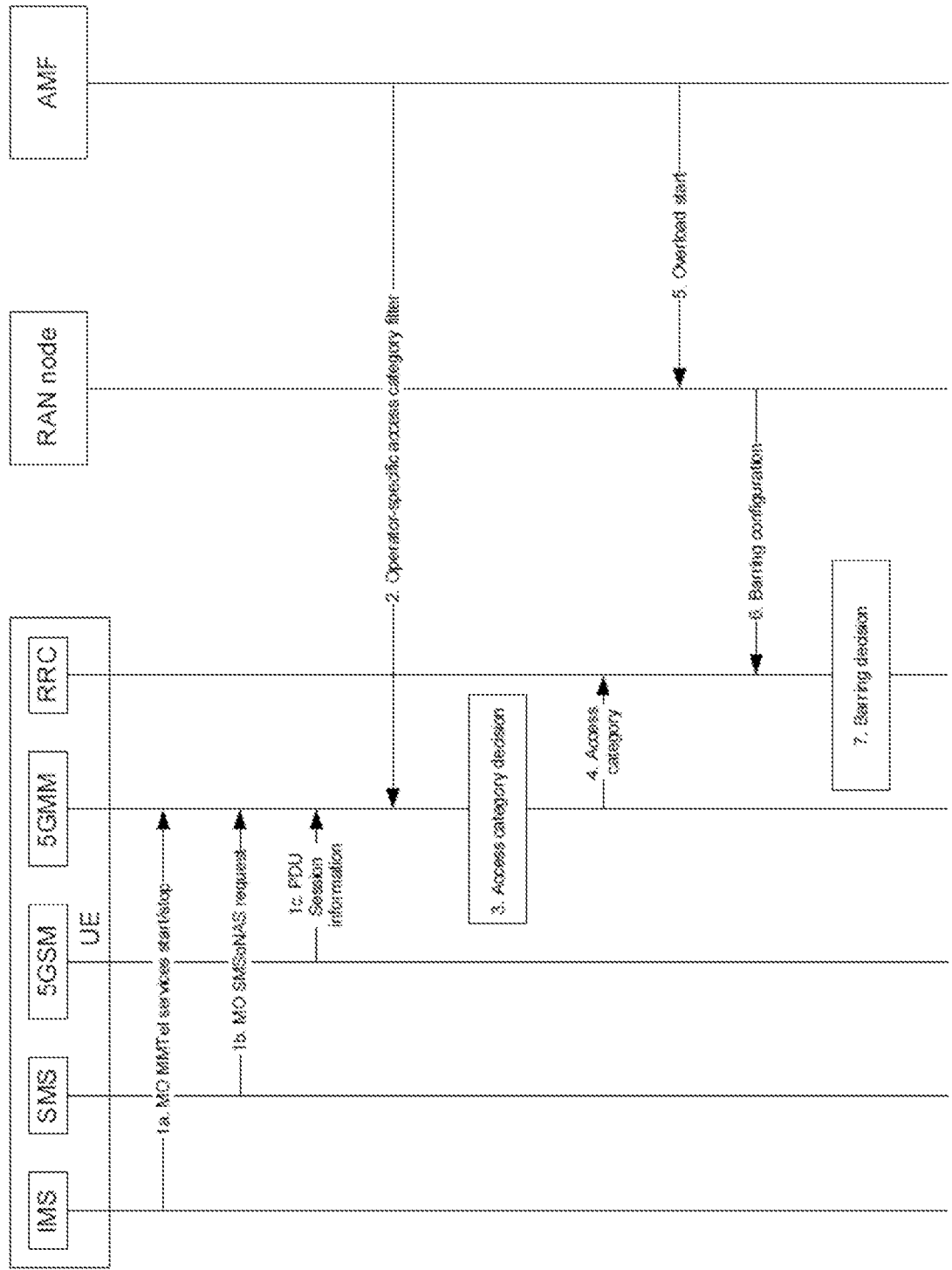
FIG. 10 diagram illustrating a network-specific access barring technique according to another example implementation.

FIG. 10 diagram illustrating a network-specific access barring technique according to another example implementation. The operations of 1-7 are described below, by way of illustrative example.

1 a. The IMS client at UE may provide at least one of the following indications to the 5GMM entity at UE either directly from the IMS client to the 5GMM entity or via the 5GSM entity:
  MO-MMTEL-voice-started;
  MO-MMTEL-voice-ended;
  MO-MMTEL-video-started;
  MO-MMTEL-video-ended;
  MO-SMSoIP-attempt-started; and
  MO-SMSoIP-attempt-ended.

From the above indications, the 5GMM entity can be aware of the start and end of mobile originated MMTel voice service, MMTel video service, and SMSoIP service.

1b. The SMS entity of UE may request the 5GMM entity to deliver an MO SMS message.

1c. The 5GSM entity of UE may request 5GSM message delivery to the 5GMM entity at UE. Together with the 5GSM message, the 5GSM entity may also provide PDU session information, e.g. PDU session ID, S-NSSAI, DNN. The 5GMM entity may store the information provided by the 5GSM entity in addition to 5GSM message, e.g. PDU session ID, S-NSSAI, DNN.

If no 5G NAS signalling connection is established for a PDU session and user data of the PDU session needs to be delivered to the network, the 5GMM entity may be requested to establish a 5G NAS signalling connection by the QoS flow controlling entity. In this case, the 5GMM entity may also receive PDU session ID of the PDU session.

2. The network may provide operator-specific access category filter(s) to the 5GMM entity of the UE via e.g., a NAS message, OMA DM. In case the operator-specific access category filter(s) is delivered via a NAS message, i.e. the AMF provides the filter(s) to the UE via a 5GMM message, the filter(s) may be coming from the PCF. The NAS message may correspond to the Ni: CONFIGURATION UPDATE COMMAND message.

Each of the access category filters is associated with an operator-specific access category and/or precedence value and may include at least one of the following criteria:
  SST; per slice, and for one or more service types;
  SD;
  application ID;
  OS ID;
  OS application ID; and
  DNN.

For example, within a slice type (or SST), there could be different Access categories for different service types (Slice ID may be, for example, a combination of SST plus SD, with SD being optional). For each combination of SST+SD (or for each network slice, where the slice can be allocated to a service type of UEs), there can be an Access Category. An access category filter may indicate an access category for each of a plurality of slices (or for each slice ID or SST). This information informs the UE how the access attempt should be assigned to an access category; this access category may be used by the UE to perform access barring analysis: For example, a filter (sent to the UE) for operator-specific access category X can indicate that SST=eMBB and SD=Amazon, which means that an access attempt subject to a eMBB network slice dedicated for Amazon services will be classified as access category X. As another example, a filter for operator-specific access category Y can indicate that DNN (data network name, which could be tied to slice, but not the same; Internet or IMS/IP multimedia subsystem)=enterprise network, which means that an access attempt subject to internal enterprise traffic should be categorized as access category Y. Subject to operator's policy, the access attempts categorized as access categories X and Y can be prioritized by setting small values of barring rates for these access categories in the broadcasted barring configuration.

The operator-specific access category filter(s) can have a higher or lower priority than standardized access category decision rules.

As can be seen from the above examples, in order to give special treatment to access attempts related to proprietary traffic for the roaming UEs and even for the UEs in the home network (if the network wants to change the previous configuration), the network shall be able to configure the UE with operator-specific access categories.

3. Taking into account information obtained from step 1 and the following information available in the 5GMM entity:
  whether the access attempt is an answer to a mobile terminated message;
  SST(s) of the PDU session(s) associated with the access attempt (SST of an already established PDU session can be available in the 5GMM entity);
  UE's registered PLMN and the UE's HPLMN/EHPLMN(s)/most preferred VPLMN(s)
  Any operator provided access category filters the UE decides a standard access category. The examples of standard access categories are:
  MO resulting from MT: the access attempt is an answer to a mobile terminated message
  MO MMTel voice: the access attempt is caused by an MO MMTel voice call
  MO MMTel voice: the access attempt is caused by an MO MMTel video call
  MO SMSoIP: the access attempt is caused by an MO SMSoIP MO SMSoNAS: the access attempt is caused by an MO SMSoNAS MO emergency: the access attempt is relevant to the emergency call MO delay tolerant service in EHPLMN: the access attempt is relevant to the delay tolerant service or UE registered to the UE's EHPLMN MO delay tolerant service in most preferred VPLMN: the access attempt is relevant to the delay tolerant service or UE registered to the UE's most preferred VPLMN MO delay tolerant service in other PLMN: the access attempt is relevant to the delay tolerant service or UE registered to other PLMN MO eMBB: the access attempt is relevant to eMBB MO URLLC: the access attempt is relevant to URLLC MO signalling: the access attempt is not for user plane radio resource request and is not relevant to other access category MO data: the access attempt is for user plane radio resource request and is not relevant to other access category VoLTE fallback: the access attempt is for initiating fallback from 5GS to voice over LTE in early 5GC network deployments There are cases where an access attempt is associated with multiple SSTs. In order to deal with these cases priority order can be decided, e.g. URLLC>eMBB>massive IoT, that is, again for example, an access attempt associated with URLLC and massive IoT are treated the same as access attempt associated with: URLLC and eMBB; or URLLC alone.

In addition, if available, the UE may decide that the access attempt is subject to an operator-specific category taking into account the filter received in step 2. In addition to what the 5GMM entity considers as input factors for the access category decision for the standard access category, the 5GMM entity additionally takes into account the parameters that are not considered as input for standard access category decision, e.g. SD(s) related to the access attempt.

4. The 5GMM entity of UE forwards the access category together with the NAS message to the RRC layer of UE.

5. The AMF (example core network entity) may indicate the load (overall network load and slice-specific loads) in the core network to the RAN node/BS. The load can be indicated per PLMN, per SST, per SD, and/or per S-NSSAI. Such information can be provided by the SMF to the RAN node. The load information can be expressed in a percentage scale per PLMN, per SST, per SD, and/or per S-NSSAI.

A) More specifically, the AMF may directly provide its load information per PLMN, per SST, per SD, and/or per S-NSSAI to the RAN node. Since the UEs served by the RAN node can be served by multiple AMFs, the RAN node may need to collect load information from all AMFs that serve the UEs served by the RAN node, in order to figure out the overall load in the core network (AMFs).

B) On the other hand, the SMF may provide the load information per PLMN, per SST, per SD, and/or per S-NSSAI to the AMF, and the AMF may forward the load information to the RAN node. Since the UEs served by the RAN node can be served by multiple SMFs, the RAN node may need to collect load information from all SMFs that serve the UEs served by the RAN node, in order to figure out the overall load in the core network (SMFs). In the message from the AMF to the RAN node, the AMF may include the AMF load information per PLMN, per SST, per SD, and/or per S-NSSAI in addition to the SMF load information to be forwarded.

C) Or the AMF can gather load information per PLMN, per SST, per SD, and/or per S-NSSAI from SMFs and provide the gathered load information to the RAN node. The gathered load information may be set so that the load of the AMF itself is also reflected in addition to the load of SMFs.

In B) and C), an SMF can indicate that resources assigned for a network slice with SST=massive IoT as overloaded (e.g. 98% load). In B) the AMF forwards the load information (the SMF's massive IoT slice resources are 98% loaded), and in C) the AMF gathers load information of massive IoT slice of SMF(s) and decides the load of massive IoT slice also taking into account the AMF's load for the massive IoT slice (in this case, how the AMF calculates the overall load for the massive IoT slice can be left to implementation).

6. The RAN node populates (determines) per-slice barring configuration (e.g., which may provide higher barring for some slices, and lower barring rates for other slices— prioritization of some traffic over others, e.g., may opt to have a lower barring rate for URLLC than for eMBB) to be broadcasted to the UE. From step 5, the RAN node may be aware of the load status of the core network per PLMN, per SST, per SD and/or per S-NSSAI. Thus, the RAN node can populate or determine the barring configuration so that load for a particular PLMN/network slice can be reduced, e.g. the barring parameters for access categories related to specific network slices (e.g. eMBB, URLLC, massive IoT, IMS) can be set so that access attempt associated with such access categories are reduced. Note that the massive IoT slice is mapped to delay tolerant service-series access categories.

The barring configuration may indicate one or more of the following, by way of illustrative example:
  whether a particular access class(es) should be barred with a certain barring rate and barring timer;
  whether a particular access category(ies) should be barred with a certain barring rate and barring timer;
  whether barring should be applied for each of the access classes in range 11-15;
  whether the RAN-level paging should be barred with a certain barring rate and barring timer;
  compensation parameter(s) (e.g. for reducing barring rate) for RRC-INACTIVE UEs; and/or
  compensation parameter(s) (e.g. for reducing barring rate) for high priority IMS PDU sessions.

Note that the barring rate and barring timer for the IMS services (MMTel voice, MMTel video, SMSoIP) and the compensation parameter(s) for high priority IMS PDU sessions may be delivered to the IMS client in the UE by the RRC layer in the UE and the IMS client can use the information for barring check for IMS services.

For example, a UE may selects a random number between 0 and 1, and determines a barring factor, and compares it to barring rate (if less than barring rate, the access attempt is not barred.

Exemplary implementation of the barring configuration broadcasted in System Information can be represented as follows:

SystemInformationBlockTypeX Information Element

-- ASN1START
SystemInformationBlockTypeX ::=    SEQUENCE {

```
    accessBarringConfiguration           SEQUENCE }
       plmn-IdentityIndex-r15            INTEGER (1..maxPLMN-r15) OPTIONAL -- Need OP
       abc-Info-r15                      SEQUENCE{
          abcForSpecialAC                BIT STRING (SIZE(5)) OPTIONAL -- Need OP
          abcForAC                       BIT STRING (SIZE(10)) OPTIONAL -- Need OP
          barringPerAccessCategoryList-r15     BarringPerAccessCategoryList-r15 OPTIONAL --
Need OP
       }
       abcConfig-r15         SEQUENCE {
          abcFactor-r15      ENUMERATED {
                                p00, p05, p10, p15, p20, p25, p30, p40,
                                p50, p60, p70, p75, p80, p85, p90, p95),
          abcTime-r15        ENUMERATED (s4, s8, s16, s32, s64, s128, s256, s512}
       }                     OPTIONAL -- Need OP
    }
BarringPerAccessCategory-r15 ::=  SEQUENCE {
    accessCategory-r15               INTEGER (1..maxAccessCategory-r15),
}
-- ASN1STOP
```

Where abc-Info-r15 pertains to collective configuration of three Access Barring Configuration types:
- for special access classes (e.g., AC 11-15) by means of abcForSpecialAC;
- for regular LTE access classes by means of abcForAC;
- for Access Categories by means of barringPerAccessCategoryList parameter, where the range of Access Categories is determined by maxAccessCategory-r15.

Some example advantages of various example implementations may include, or example, that air interface and UE's RRC layer becomes adaptable, extendable and to high degree transparent in terms of provision or barring of particular access attempts. While NW (network) has the means to control various services and terminal access attempts in the same unified manner. Assuming the Access Category List is defined in RRC layer in extendable manner, the technique allows adding potentially new services without the need to change service accessibility framework.

7. The RRC layer of UE bars access attempts according to the broadcasted barring configuration, and the information on the access attempt, e.g., at least one of the following, for example:
- access category from the 5GMM entity;
- access class(es) of the UE; and/or (do not cover use of access classes)
- whether the access attempt is triggering change from RRC-INACTIVE to RRC-CONNECTED and, if yes, whether the access attempt is triggered by RAN-level paging.

For example, if the 5GMM entity of a UE in the RRC-INACTIVE mode requested the RRC layer to transport a NAS message with access category=MO SMSoNAS and the barring configuration indicates that the barring rate for access category=MO SMSoNAS is 40% and the compensation parameter for RRC-INACTIVE UEs is 0.3, the access attempt for the MO SMSoNAS should be barred with a probability 0.4*0.3=0.12 (12% of such access attempt will be barred).

In an example implementation, the RRC layer of UE may obtain access class(es) of the UE from the USIM, but if this is not available, the upper layer can provide the RRC layer of UE with the access class(es) of the UE.

If the access attempt for a UE in the RRC-INACTIVE mode is barred, the RRC layer should indicate the upper layer of the barring result with a specific cause. The cause should indicate that the UE is barred due to barring configuration of the RAN node so that this case can be distinguished from the radio link failure. In this case, both in the RRC layer and in the NAS layer, the UE turns into the idle mode. The NAS layer shall operate as if the UE is barred in the idle mode.

LIST OF EXAMPLE ABBREVIATIONS

Figure 11:
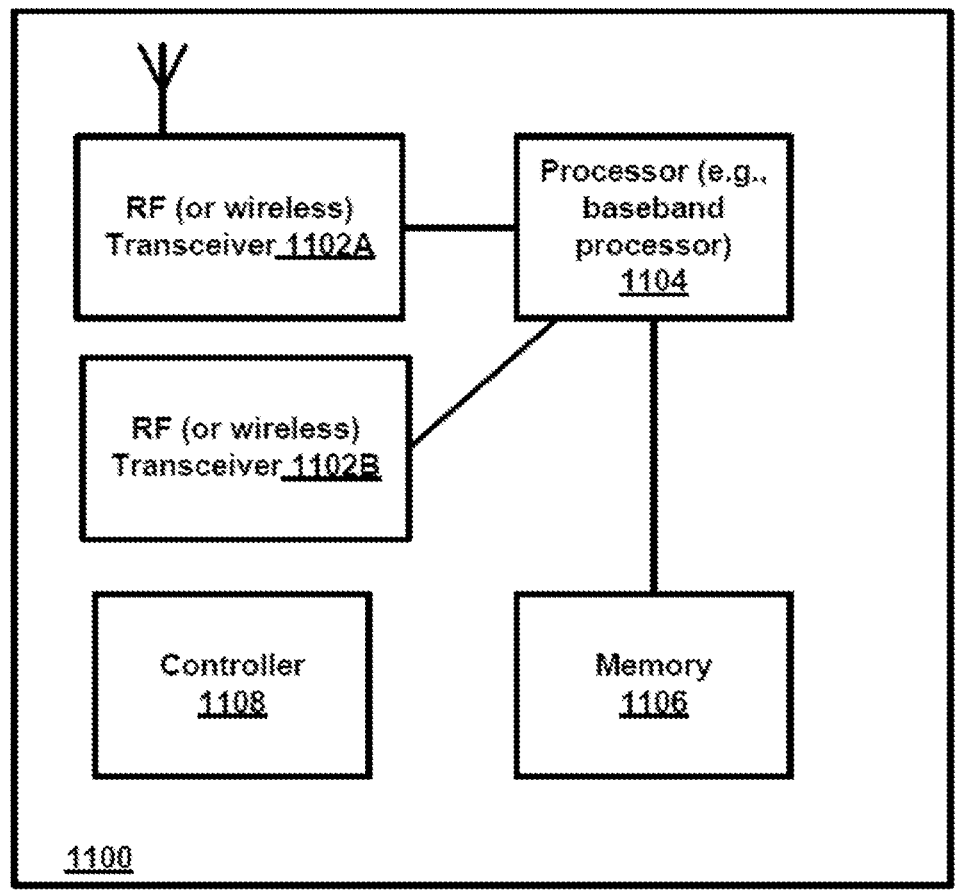
FIG. 11 is a block diagram of a node or wireless station (e.g., base station/access point, relay node, or mobile station/user device) according to an example implementation.

3GPP: third generation partnership project
4G: fourth generation of mobile telecommunication technology
5G: fifth generation of mobile telecommunication technology
5GMM: 5GS mobility management
5GS: 5G system
5GSM: 5GS session management
ACB: access class barring
AMF: access and mobility management function
CSFB: circuit switched fallback
DM: device management
DN: data network
DNN: data network name
EHPLMN: equivalent HPLMN
eMBB: enhanced mobile broadband
eNB: evolved Node B
EPS: evolved packet system
gNB: next generation Node B (uncertain)
HPLMN home PLMN
IMS: IP multimedia subsystem
IoT: internet of things
IP: internet protocol
MME: mobility management entity
MMTel: IMS multimedia telephony service
NAS: non-access stratum
NGAP: next generation application protocol
NSSAI: network slice selection assistance information
OAM: operations, administration, and management
OMA: open mobile alliance
OS: operating system
PCF: policy control function
PDU: protocol data unit
PLMN public land mobile network
RAN: radio access network
RRC: radio resource control
S-NSSAI: single NSSAI
SD: slice differentiator
SMS: short message service
SMSoNAS: SMS over NAS SMSoIP: SMS over IP
SSAC: service specific access control
SST: slice/service type
UDM: user data management
UE: user equipment
UPF: user plane function
URLLC: ultra-reliable and low latency communication
VPLMN: visited PLMN FIG. 11 is a block diagram of a wireless station (e.g., AP, BS, eNB, UE or user device) 1100 according to an example implementation. The wireless station 1100 may include, for example, one or two RF (radio frequency) or wireless transceivers 1102A, 1102B, where each wireless transceiver includes a transmitter to transmit signals and a receiver to receive signals. The wireless station also includes a processor or control unit/entity (controller) 1104 to execute instructions or software and control transmission and receptions of signals, and a memory 1106 to store data and/or instructions.

Processor 1104 may also make decisions or determinations, generate frames, packets or messages for transmission, decode received frames or messages for further processing, and other tasks or functions described herein. Processor 1104, which may be a baseband processor, for example, may generate messages, packets, frames or other signals for transmission via wireless transceiver 1102 (1102A or 1102B). Processor 1104 may control transmission of signals or messages over a wireless network, and may control the reception of signals or messages, etc., via a wireless network (e.g., after being down-converted by wireless transceiver 1102, for example). Processor 1104 may be programmable and capable of executing software or other instructions stored in memory or on other computer media to perform the various tasks and functions described above, such as one or more of the tasks or methods described above. Processor 1104 may be (or may include), for example, hardware, programmable logic, a programmable processor that executes software or firmware, and/or any combination of these. Using other terminology, processor 1104 and transceiver 1102 together may be considered as a wireless transmitter/receiver system, for example.

In addition, referring to FIG. 11, a controller (or processor) 1108 may execute software and instructions, and may provide overall control for the station 1100, and may provide control for other systems not shown in FIG. 11, such as controlling input/output devices (e.g., display, keypad), and/or may execute software for one or more applications that may be provided on wireless station 1100, such as, for example, an email program, audio/video applications, a word processor, a Voice over IP application, or other application or software.

In addition, a storage medium may be provided that includes stored instructions, which when executed by a controller or processor may result in the processor 1104, or other controller or processor, performing one or more of the functions or tasks described above.

According to another example implementation, RF or wireless transceiver(s) 1102A/1102B may receive signals or data and/or transmit or send signals or data. Processor 1104 (and possibly transceivers 1102A/1102B) may control the RF or wireless transceiver 1102A or 1102B to receive, send, broadcast or transmit signals or data.

The embodiments are not, however, restricted to the system that is given as an example, but a person skilled in the art may apply the solution to other communication systems. Another example of a suitable communications system is the 5G concept. It is assumed that network architecture in 5G will be quite similar to that of the LTE-advanced. 5G is likely to use multiple input—multiple output (MIMO) antennas, many more base stations or nodes than the LTE (a so-called small cell concept), including macro sites operating in co-operation with smaller stations and perhaps also employing a variety of radio technologies for better coverage and enhanced data rates.

It should be appreciated that future networks will most probably utilise network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications this may mean node operations may be carried out, at least partly, in a server, host or node operationally coupled to a remote radio head. It is also possible that node operations will be distributed among a plurality of servers, nodes or hosts. It should also be understood that the distribution of labour between core network operations and base station operations may differ from that of the LTE or even be non-existent.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device or in a propagated signal, for execution by, or to control the operation of, a data processing apparatus, e.g., a programmable processor, a computer, or multiple computers. Implementations may also be provided on a computer readable medium or computer readable storage medium, which may be a non-transitory medium. Implementations of the various techniques may also include implementations provided via transitory signals or media, and/or programs and/or software implementations that are downloadable via the Internet or other network(s), either wired networks and/or wireless networks. In addition, implementations may be provided via machine type communications (MTC), and also via an Internet of Things (IOT).

The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers.

Furthermore, implementations of the various techniques described herein may use a cyber-physical system (CPS) (a system of collaborating computational elements controlling physical entities). CPS may enable the implementation and exploitation of massive amounts of interconnected ICT devices (sensors, actuators, processors microcontrollers, . . . ) embedded in physical objects at different locations. Mobile cyber physical systems, in which the physical system in question has inherent mobility, are a subcategory of cyber-physical systems. Examples of mobile physical systems include mobile robotics and electronics transported by humans or animals. The rise in popularity of smartphones has increased interest in the area of mobile cyber-physical systems. Therefore, various implementations of techniques described herein may be provided via one or more of these technologies.

A computer program, such as the computer program(s) described above, can be written in any form of programming language, including compiled or interpreted languages, and can be deployed in any form, including as a stand-alone program or as a module, component, subroutine, or other unit or part of it suitable for use in a computing environment. A computer program can be deployed to be executed on one computer or on multiple computers at one site or distributed across multiple sites and interconnected by a communication network.

Method steps may be performed by one or more programmable processors executing a computer program or computer program portions to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer, chip or chipset. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, implementations may be implemented on a computer having a display device, e.g., a cathode ray tube (CRT) or liquid crystal display (LCD) monitor, for displaying information to the user and a user interface, such as a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the various embodiments.

The invention claimed is:

1. A method comprising:
   receiving, by a user device, a non-access stratum message that comprises one or more operator-specific access category filters, wherein each operator-specific access category filter of the one or more operator-specific access category filters is associated with an operator-specific access category and includes a slice/service type, wherein the non-access stratum message additionally comprises at least one further operator-specific access category filter, wherein each further operator-specific access category filter of the at least one further operator-specific access category filter is associated with an operator-specific access category and includes an operating system application identifier and an operating system identifier;
   detecting, by the user device, a network slice or an application associated with an access attempt by the user device to access a wireless network;
   determining, by the user device, an operator-specific access category associated with the access attempt based on the network slice associated with the access attempt and the one or more operator-specific access category filters or based on the application associated with the access attempt and the at least one further operator-specific access category filter; and
   making, by the user device, a barring decision for the access attempt based on the operator-specific access category associated with the access attempt.

2. A method of claim 1, wherein the making the barring decision comprises:
   making, by the user device based on the operator-specific access category associated with the access attempt, a decision that the access attempt is not barred; and
   the method further comprising performing, by the user device based on the decision, the access attempt to the wireless network.

3. The method of claim 2, wherein the performing the access attempt comprises:
   sending, by the user device, a radio resource control (RRC) connection request message to request a connection to the wireless network.

4. The method of claim 1, further comprising:
   receiving, by the user device, a barring configuration that indicates a set of barring parameters for one or more operator-specific access categories of at least one of the one or more operator-specific access category filters and the at least one further operator-specific access category filter; and
   wherein the making the barring decision for the access attempt includes making, by the user device, a barring decision for the access attempt based on the barring configuration and the operator-specific access category associated with the access attempt.

5. The method of claim 4, wherein the barring configuration indicates whether a particular operator-specific access category of the one or more operator-specific access categories should be barred with a certain barring factor and barring timer, and wherein the making the barring decision for the access attempt based on the barring configuration and the operator-specific access category associated with the access attempt comprises, when the barring configuration indicates that the operator-specific access category associated with the access attempt should be barred with the certain barring factor and barring time:
  generating a random number; and
  deciding that the access attempt is not barred when the random number is less than the certain barring factor, otherwise deciding that the access attempt is at least temporally barred.

6. The method of claim 4, wherein the set of barring parameters includes at least a barring rate and a barring timer.

7. The method of claim 4, wherein the barring configuration is based on a network slice-specific load information that indicates a network load for each of one or more network slices.

8. The method of claim 4, wherein the barring configuration that indicates a set of barring parameters for the one or more operator-specific access categories provides a different prioritization of one or more access attempts based on operator-specific access categories of the access attempts.

9. The method of claim 1, wherein the network slice associated with the access attempt is identified by one or more of the following:
  a slice/service type (SST); and
  a slice/service type (SST) and slice differentiator (SD).

10. The method of claim 1, further comprising:
  receiving a compensation parameter for a user device in Inactive mode;
  determining, by the user device, that the user device is in Inactive mode; and
  wherein the making the barring decision comprises:
  applying, by the user device, the compensation parameter to the making the barring decision for the user device to adjust a barring rate of the access attempt of the user device that is in Inactive mode.

11. The method according to claim 1, wherein each operator-specific access category of at least one of the one or more operator-specific access category filters is further associated with a slice differentiator.

12. The method according to claim 1, wherein the non-access stratum message is a 5G system mobility management message, and wherein the wireless network is a 5G wireless network.

13. The method of claim 1, wherein each operator-specific access category of at least one of the one or more operator-specific access category filters is associated with a precedence value and/or wherein at least one of the at least one further operator-specific access category filter is associated with a precedence value.

14. A method comprising:
  receiving, by a base station from a core network entity within a wireless network, a non-access stratum message that comprises one or more operator-specific access category filters, wherein each operator-specific access category filter of the one or more operator-specific access category filters is associated with an operator-specific access category and includes a slice/service type, wherein the non-access stratum message additionally comprises at least one further operator-specific access category filter, wherein each further operator-specific access category filter of the at least one further operator-specific access category filter is associated with an operator-specific access category and includes an operating system application identifier and an operating system identifier;
  sending, by the base station, the non-access stratum message to a user device;
  receiving, by the base station from the network entity within the wireless network, network slice-specific load information that indicates a load for each of one or more network slices;
  determining, by the base station based on the received network slice-specific load information, a barring configuration that indicates a set of barring parameters for one or more operator-specific access categories of at least one of the one or more operator-specific access category filters and the at least one further operator-specific access category filter; and
  sending, by the base station to the user device, the barring configuration, wherein the barring configuration is configured to reduce a load on the wireless network.

15. The method of claim 14, wherein the barring configuration that indicates the set of barring parameters for the one or more operator-specific access categories indicates whether an access attempt with which a network slice is associated is triggered by radio access network (RAN)-level paging.

16. The method of claim 15, wherein the sending comprises sending, by the base station to a user device, the barring configuration, to allow the user device to make a barring decision for an access attempt by the user device based on a network slice associated with the access attempt by the user device.

17. The method of claim 14, wherein the set of barring parameters includes at least a barring rate and a barring timer.

18. The method of claim 14, wherein the one or more network slices are identified by one or more of the following:
  a slice/service type (SST); and
  a slice/service type (SST) and slice differentiator (SD).

19. The method of claim 14, wherein the barring configuration indicates whether a particular operator-specific access category should be barred with a certain barring factor and barring timer.

20. The method according to claim 14, wherein each operator-specific access category of at least one of the one or more operator-specific access category filters is further associated with a slice differentiator.

21. The method according to claim 14, wherein the non-access stratum message is a 5G system mobility management message, and wherein the wireless network is a 5G wireless network.

22. The method of claim 14, wherein each operator-specific access category of at least one of the one or more operator-specific access category filters is associated with a precedence value and/or wherein at least one of the at least one further operator-specific access category filter is associated with a precedence value.

23. A method comprising:
  sending, by a core network entity of a wireless network, a non-access stratum message that comprises one or more operator-specific access category filters via a base station to a user device, wherein each operator-specific access category filter of the one or more operator-specific access category filters is associated with an operator-specific access category and includes a slice/service type, wherein the non-access stratum message additionally comprises at least one further operator-specific access category filter, wherein each further operator-specific access category filter of the at least one further-operator specific access category filter is associated with an operator-specific access category and includes an operating system application identifier and an operating system identifier;

determining, by the core network entity, network slice-specific load information that indicates a load for each of one or more network slices; and sending, by the core network entity to the base station, the network-slice specific load information.

24. The method of claim 23, where the core network entity comprises a first core network entity, and wherein the network slice-specific load information is determined by the first core network entity from one or more of the following:
network slice-specific load information determined or gathered by the first core network entity; and
network slice-specific load information received from a second core network entity.

25. The method of claim 23, and further comprising:
sending, by the core network entity to a user device, one or more operator-specific access category filter definitions that indicate an operator-specific access category associated with one or more network slices.

26. The method of claim 23, wherein the one or more network slices are identified by or associated with one or more of the following:
a slice/service type (SST); and
a slice/service type (SST) and slice differentiator (SD).

27. The method according to claim 23, wherein each operator-specific access category of at least one of the one or more operator-specific access category filters is further associated with a slice differentiator.

28. The method according to claim 23, wherein the non-access stratum message is a 5G system mobility management message, and wherein the wireless network is a 5G wireless network.

29. The method of claim 23, wherein each operator-specific access category of at least one of the one or more operator-specific access category filters is associated with a precedence value and/or wherein at least one of the at least one further operator-specific access category filter is associated with a precedence value.

30. A user equipment, comprising at least one processor and at least one memory including computer instructions that, when executed by the at least one processor, cause the user equipment to perform:
receiving a non-access stratum message that comprises one or more operator-specific access category filters, wherein each operator-specific access category filter of the one or more operator specific access category filters is associated with an operator-specific access category and includes a slice/service type, wherein the non-access stratum message additionally comprises at least one further operator-specific access category filter, wherein each further operator-specific access category filter of the at least one further operator-specific access category filter is associated with an operator-specific access category and includes an operating system application identifier and an operating system identifier;
detecting a network slice or an application associated with an access attempt by the user device to access a wireless network;
determining an operator-specific access category based on the network slice associated with the access attempt and the one or more operator-specific access category filters or based on the application associated with the access attempt and the at least one further operator-specific access category filter; and
making a barring decision for the access attempt based on the operator-specific access category associated with the access attempt.

31. A user equipment of claim 30, wherein the making the barring decision comprises:
making, based on the operator-specific access category associated with the access attempt, a decision that the access attempt is not barred; and
wherein the computer instructions that, when executed by the at least one processor, further cause the user equipment to perform performing, based on the decision, the access attempt to the wireless network.

32. The user equipment of claim 31, wherein the performing the access attempt comprises:
sending a radio resource control (RRC) connection request message to request a connection to the wireless network.

33. The user equipment of claim 30, wherein the computer instructions that, when executed by the at least one processor, further cause the user equipment to perform:
receiving a barring configuration that indicates a set of barring parameters for one or more operator-specific access categories of at least one of the one or more operator-specific access category filters and the at least one further operator-specific access category filter; and
wherein the making the barring decision for the access attempt includes making the barring decision for the access attempt based on the barring configuration and the operator-specific access category associated with the access attempt.

34. The user equipment of claim 33, wherein the barring configuration indicates whether a particular operator-specific access category of the one or more operator-specific access categories should be barred with a certain barring factor and barring timer, and wherein the making the barring decision for the access attempt based on the barring configuration and the operator-specific access category associated with the access attempt comprises, when said barring configuration indicates that the operator-specific access category associated with the access attempt should be barred with the certain barring factor and barring time:
generating a random number; and
deciding that the access attempt is not barred when the random number is less than the certain barring factor, otherwise deciding that the access attempt is at least temporally barred.

35. The user equipment of claim 33, wherein the set of barring parameters includes at least a barring rate and a barring timer.

36. The user equipment of claim 33, wherein the barring configuration is based on a network slice-specific load information that indicates a network load for each of one or more network slices.

37. The user equipment of claim 33, wherein the barring configuration that indicates the set of barring parameters for the one or more operator-specific access categories provides a different prioritization of one or more access attempts based on operator-specific access categories of the access attempts.

38. The user equipment of claim 30, wherein the network slice associated with the access attempt is identified by one or more of the following:
a slice/service type (SST); and
a slice/service type (SST) and slice differentiator (SD).

39. The user equipment of claim 30, wherein the computer instructions that, when executed by the at least one processor, further cause the user equipment to perform:
receiving a compensation parameter for a user device in Inactive mode;
determining that the user device is in Inactive mode; and
wherein the making the barring decision comprises:
applying the compensation parameter to the making the barring decision for the user device to adjust a barring rate of the access attempt of the user device that is in Inactive mode.

40. The user equipment according to claim 30, wherein each operator-specific access category of at least one of the one or more operator-specific access category filters is further associated with a slice differentiator.

41. The user equipment according to claim 30, wherein the non-access stratum message is a 5G system mobility management message, and wherein the wireless network is a 5G wireless network.

42. The method of claim 30, wherein each operator-specific access category of at least one of the one or more operator-specific access category filters is associated with a precedence value and/or wherein at least one of the at least one further operator-specific access category filter is associated with a precedence value.

43. An apparatus comprising a computer program product including a non-transitory computer-readable storage medium and storing executable code that, when executed by at least one data processing apparatus, is configured to cause the at least one data processing apparatus to perform:
receiving, by a user device, a non-access stratum message that comprises one or more operator-specific access category filters, wherein each operator-specific access category filter of the one or more operator-specific access category filters is associated with an operator-specific access category and includes a slice/service type, wherein the non-access stratum message additionally comprises at least one further operator-specific access category filter, wherein each further operator-specific access category filter of the at least one further operator-specific access category filter is associated with an operator-specific access category and includes an operating system application identifier and an operating system identifier,
detecting, by the user device, a network slice or an application associated with an access attempt by the user device to access a wireless network;
determining, by the user device, an operator-specific access category associated with the access attempt based on the network slice associated with the access attempt and the one or more operator-specific access category filters or based on the application associated with the access attempt and the at least one further operator-specific access category filter; and
making, by the user device, a barring decision for the access attempt based on the operator-specific access category associated with the access attempt.

44. A base station, comprising at least one processor and at least one memory including computer instructions that, when executed by the at least one processor, cause the base station to perform:
receiving from a core network entity within a wireless network, a non-access stratum message that comprises one or more operator-specific access category filters, wherein each operator-specific access category filter of the one or more operator-specific access category filters is associated with an operator-specific access category and includes a slice/service type, wherein the non-access stratum message additionally comprises at least one further operator-specific access category filter, wherein each further operator-specific access category filter of the at least one further operator-specific access category filter is associated with an operator-specific access category and includes an operating system application identifier and an operating system identifier;
sending, to a user device, the non-access stratum message;
receiving from the core network entity within the wireless network, network slice-specific load information that indicates a load for each of one or more network slices;
determining based on the received network slice-specific load information, a barring configuration that indicates a set of barring parameters for one or more operator-specific access categories of at least one of the one or more operator-specific access category filters and the at least one further operator-specific access category filter; and
sending, to the user device, the barring configuration, wherein the barring configuration is configured to reduce a load on the wireless network.

45. The base station of claim 44, wherein the barring configuration that indicates the set of barring parameters for the one or more operator-specific access categories indicates whether an access attempt with which a network slice is associated is triggered by radio access network (RAN)-level paging.

46. The base station of claim 45, wherein the sending comprises sending, by the base station to the user device, the barring configuration, to allow the user device to make a barring decision for an access attempt based on a network slice associated with the access attempt by the user device.

47. The base station of claim 44, wherein the set of barring parameters includes at least a barring rate and a barring timer.

48. The base station of claim 44, wherein the barring configuration indicates whether a particular operator-specific access category should be barred with a certain barring factor and barring timer.

49. The base station of claim 44, wherein the one or more network slices are identified by one or more of the following:
a slice/service type (SST); and
a slice/service type (SST) and slice differentiator (SD).

50. The base station according to claim 44, wherein each operator-specific access category of at least one of the one or more operator-specific access category filters is further associated with a slice differentiator.

51. The base station according to claim 44, wherein the non-access stratum message is a 5G system mobility management message, and wherein the wireless network is a 5G wireless network.

52. The method of claim 44, wherein each operator-specific access category of at least one of the one or more operator-specific access category filters is associated with a precedence value and/or wherein at least one of the at least one further operator-specific access category filter is associated with a precedence value.

53. A core network entity of a wireless network, comprising at least one processor and at least one memory including computer instructions that, when executed by the at least one processor, cause the core network entity to perform:
sending a non-access stratum message that comprises one or more operator-specific access category filters via a base station to a user device, wherein each operator-specific access category filter of the one or more operator-specific access category filters is associated with an operator-specific access category and includes a slice/service type, wherein the non-access stratum message additionally comprises at least one further operator-specific access category filter, wherein each further operator-specific access category filter of the at least one further operator-specific access category filter is associated with an operator-specific access category and includes an operating system application identifier and an operating system identifier;

determining network slice-specific load information that indicates a load for each of one or more network slices; and sending to the base station, the network-slice specific load information.

54. The core network entity of claim 53, where the core network entity comprises a first core network entity, and wherein the network slice-specific load information is determined by the first core network entity from one or more of the following:

network slice-specific load information determined or gathered by the first core network entity; and network slice-specific load information received from a second core network entity.

55. The core network entity of claim 53, wherein the computer instructions that, when executed by the at least one processor, further cause the core network entity to perform:

sending to a user device, one or more operator-specific access category filter definitions that indicate an operator-specific access category associated with one or more network slices.

56. The core network entity of claim 53, wherein the one or more network slices are identified by or associated with one or more of the following:

a slice/service type (SST); and a slice/service type (SST) and slice differentiator (SD).

57. The core network entity according to claim 53, wherein each operator-specific access category of at least one of the one or more operator-specific access category filters is further associated with a slice differentiator, and wherein the wireless network is a 5G wireless network.

58. The base station according to claim 53, wherein the non-access stratum message is a 5G system mobility management message.

59. The method of claim 53, wherein each operator-specific access category of at least one of the one or more operator-specific access category filters is associated with a precedence value and/or wherein at least one of the at least one further operator-specific access category filter is associated with a precedence value.

* * * * *

UNITED STATES PATENT AND TRADEMARK OFFICE
CERTIFICATE OF CORRECTION

| | | |
|---|---|---|
| PATENT NO. | : 12,108,324 B2 | Page 1 of 1 |
| APPLICATION NO. | : 16/638267 | |
| DATED | : October 1, 2024 | |
| INVENTOR(S) | : Sung Hwan Won et al. | |

It is certified that error appears in the above-identified patent and that said Letters Patent is hereby corrected as shown below:

In the Claims

In Column 26, Line 14, Claim 31, delete "perform performing," and insert -- perform, --, therefor.

In Column 27, Line 20, Claim 42, delete "method of" and insert -- user equipment according to --, therefor.

In Column 27, Line 44, Claim 43, delete "identifier," and insert -- identifier; --, therefor.

In Column 28, Line 54, Claim 52, delete "method of" and insert -- base station according to --, therefor.

In Column 30, Line 18, Claim 58, delete "base station" and insert -- core network entity --, therefor.

In Column 30, Line 20, Claim 59, delete "method of" and insert -- core network entity according to --, therefor.

Signed and Sealed this
Eighth Day of April, 2025

Coke Morgan Stewart
*Acting Director of the United States Patent and Trademark Office*